United States Patent
Zhang et al.

(10) Patent No.: US 11,843,803 B2
(45) Date of Patent: *Dec. 12, 2023

(54) TRANSFORM METHOD, INVERSE TRANSFORM METHOD, CODER, DECODER AND STORAGE MEDIUM

(71) Applicant: GUANGDONG OPPO MOBILE TELECOMMUNICATIONS CORP., LTD., Guangdong (CN)

(72) Inventors: Wei Zhang, Guangdong (CN); Fuzheng Yang, Guangdong (CN); Shuai Wan, Guangdong (CN); Yanzhuo Ma, Guangdong (CN); Junyan Huo, Guangdong (CN); Sujun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,927

(22) Filed: Jun. 21, 2022

(65) Prior Publication Data
US 2022/0329858 A1 Oct. 13, 2022

Related U.S. Application Data

(63) Continuation of application No. 17/646,168, filed on Dec. 28, 2021, now Pat. No. 11,412,259, which is a (Continued)

(51) Int. Cl.
*H04N 19/60* (2014.01)
*H04N 19/176* (2014.01)
(Continued)

(52) U.S. Cl.
CPC .......... *H04N 19/60* (2014.11); *H04N 19/176* (2014.11); *H04N 19/30* (2014.11); *H04N 19/597* (2014.11)

(58) Field of Classification Search
CPC ...... H04N 19/60; H04N 19/176; H04N 19/30; H04N 19/597
See application file for complete search history.

(56) References Cited

U.S. PATENT DOCUMENTS

| 2017/0034122 A1 | 2/2017 | Hoffmann |
| 2017/0214943 A1 | 7/2017 | Cohen et al. |

(Continued)

FOREIGN PATENT DOCUMENTS

| CN | 108632607 A | 10/2018 |
| CN | 109196559 A | 1/2019 |

(Continued)

OTHER PUBLICATIONS

International Search Report dated Mar. 11, 2020 of PCT/CN2019/094105 (6 pages).
Queiroz, Ricardo L, et al., "Compression of 3D Point Clouds using a Region-Adaptive Hierarchical Transform", submitted for publication in IEEE Transactions on Image Processing; copyright IEEE, May 2016.

(Continued)

*Primary Examiner* — Jae N Noh
(74) *Attorney, Agent, or Firm* — PERKINS COIE LLP

(57) ABSTRACT

Provided by the implementations of the present disclosure are a transform method, a coder, a decoder and a computer readable storage medium. The transform method includes: determining normal vectors of encoding points in an encoding point cloud; analyzing the sum total of all coordinates of the normal vectors on the basis of the normal vectors of the encoding points; and determining a transform sequence on the basis of the sum total of all coordinates of the normal vectors.

20 Claims, 21 Drawing Sheets

Related U.S. Application Data continuation of application No. PCT/CN2019/094105, filed on Jun. 30, 2019.

(51) Int. Cl.
*H04N 19/30* (2014.01)
*H04N 19/597* (2014.01)

(56) References Cited

U.S. PATENT DOCUMENTS

| | | | |
|---|---|---|---|
| 2017/0347100 | A1 | 11/2017 | Chou et al. |
| 2017/0347122 | A1 | 11/2017 | Chou et al. |
| 2021/0209811 | A1* | 7/2021 | Ramasubramonian ............ H04N 19/597 |

FOREIGN PATENT DOCUMENTS

| | | | |
|---|---|---|---|
| JP | 2015513719 | A | 5/2015 |
| WO | 2019103009 | A1 | 5/2019 |

OTHER PUBLICATIONS

Written Opinion of the International Searching Authority dated Mar. 11, 2020 of PCT/CN2019/094105 (12 pages).

Examination Report for Indian Application No. 202117061123 dated Jun. 29, 2022. 8 pages with English translation.

3DG "G-PCC Codec description V1" ISO/IEC JTC1/SC29/WG11 N18015; Oct. 2018; Macau, China. 31 pages.

3DG "V-PCC Codec description" ISO/IEC JTC1/SC29/WG11 MPEG2019/N18190; Jan. 2019; Marrakech, MA. 38 pages.

Extended European Search Report for European Application No. 19936282.3 dated Jan. 27, 2023. 10 pages with English translation.

Schwarz, S. et al. "Emerging MPEG Standards for Point Cloud Compression" IEEE Journal on Emerging and Selected Topics in Circuits and Systems, Mar. 2019; vol. 9, No. 1; pp. 133-148.

Decision of Grant of Japanese Application No. 2021-578138, dated Jul. 14, 2023. 5 pages with English translation.

G-PCC codec description v2, MPEG 125-Marrakesh, N18189, ISO/IEC JCT1/S C29/WG11, Jan. 18, 2019. 40 pages.

\* cited by examiner

| x: | 0<br>000 | 1<br>001 | 2<br>010 | 3<br>011 | 4<br>100 | 5<br>101 | 6<br>110 | 7<br>111 |
|---|---|---|---|---|---|---|---|---|
| y: 0<br>000 | 000000 | 000001 | 000100 | 000101 | 010000 | 010001 | 010100 | 010101 |
| 1<br>001 | 000010 | 000011 | 000110 | 000111 | 010010 | 010011 | 010110 | 010111 |
| 2<br>010 | 001000 | 001001 | 001100 | 001101 | 011000 | 011001 | 011100 | 011101 |
| 3<br>011 | 001010 | 001011 | 001110 | 001111 | 011010 | 011011 | 011110 | 001111 |
| 4<br>100 | 100000 | 100001 | 100100 | 100101 | 110000 | 110001 | 110100 | 110101 |
| 5<br>101 | 100010 | 100011 | 100110 | 100111 | 110010 | 110011 | 110110 | 110111 |
| 6<br>110 | 101000 | 101001 | 101100 | 101101 | 111000 | 111001 | 111100 | 111101 |
| 7<br>111 | 101010 | 101011 | 101110 | 101111 | 111010 | 111011 | 111110 | 111111 |

TRANSFORM METHOD, INVERSE TRANSFORM METHOD, CODER, DECODER AND STORAGE MEDIUM

CROSS-REFERENCE TO RELATED APPLICATION

The present application is a continuation application of U.S. application Ser. No. 17/646,168 filed on Dec. 28, 2021, which is a continuation application of International PCT Application No. PCT/CN2019/094105, filed on Jun. 30, 2019. The entire contents of the above-identified applications are hereby incorporated by reference.

TECHNICAL FIELD

Implementations of the present disclosure relate to the technical field of video encoding and decoding, in particular to a transform method, an inverse transform method, an encoder, a decoder, and a storage medium.

BACKGROUND

In an encoder framework of Geometry-based Point Cloud Compression (G-PCC), geometric information of a point cloud and attribute information corresponding to each point cloud are encoded separately. After geometric coding is completed, the geometric information is reconstructed, and coding of the attribute information will depend on the reconstructed geometric information.

At present, attribute information coding mainly aims at coding of color information. Firstly, color information is transformed from an RGB color space to a YUV color space. Then, the reconstructed geometric information is used for recoloring a point cloud, so that uncoded attribute information corresponds to the reconstructed geometric information. In color information coding, there are mainly two transform methods, one is distance-based promotion transform which depends on Level of Detail (LOD) partitioning, and the other is Region Adaptive Hierarchical Transform (RAHT) which is directly performed. According to the both methods, color information is transformed from a spatial domain to a frequency domain, high-frequency and low-frequency coefficients are obtained through transform, and finally the coefficients are quantized and coded to generate a binary bitstream. Among them, the RAHT transform is performed on a basis of a hierarchical structure obtained through octree partitioning performed on point cloud data, starting from a lowest level of an octree up to a highest level, traversing every node in each layer. An RAHT transform of each node is performed sequentially in x, y, and z directions of three-dimensional coordinates in accordance with a transform order.

However, since different point clouds have different spatial distributions, when an RAHT transform is performed, transform coefficients obtained by using a fixed transform order still have large information redundancy, resulting in a poor coding efficiency.

SUMMARY

An implementation of the present disclosure provides a transform method, an inverse transform method, an encoder, a decoder, and a storage medium, which can reduce redundancy of transform coefficients obtained by transform and improve a coding efficiency.

Technical solutions of the implementations of the present disclosure may be implemented as follows.

In a first aspect, an implementation of the present disclosure provides a transform method, which is applied to an encoder, including: determining a normal vector of an encoding point in an encoding point cloud; counting a sum of each coordinate of the normal vector based on the normal vector of the encoding point; and determining a transform order based on the sum of each coordinate of the normal vector.

In a second aspect, an implementation of the present disclosure further provides a transform method, which is applied to an encoder, including: determining three two-dimensional projection planes of an encoding point in an encoding point cloud on three coordinate planes formed in a three-dimensional space; counting a projection area of each coordinate plane based on the three two-dimensional projection planes; and determining a transform order based on the projection area.

In a third aspect, an implementation of the present disclosure further provides an inverse transform method, including: parsing an attribute bitstream to obtain a transform order; and performing inverse Region Adaptive Hierarchical Transform (RAHT) transform based on the transform order during decoding.

In a fourth aspect, an implementation of the present disclosure provides an encoder, including: a determining part configured to determine a normal vector of an encoding point in an encoding point cloud; and an obtaining part configured to count a sum of each coordinate of the normal vector based on the normal vector of the encoding point; the determining part is further configured to determine a transform order based on the sum of each coordinate of the normal vector.

In a fifth aspect, an implementation of the present disclosure further provides an encoder, including: a determining part configured to determine three two-dimensional projection planes of an encoding point in an encoding point cloud on three coordinate planes formed in a three-dimensional space; and an obtaining part configured to count a projection area of each coordinate plane based on the three two-dimensional projection planes; the determining part is further configured to determine a transform order based on the projection area.

In a sixth aspect, an implementation of the present disclosure provides a decoder, including: a parsing part configured to parse an attribute bitstream to obtain a transform order; and a decoding part configured to perform inverse Region Adaptive Hierarchical Transform (RAHT) transform based on the transform order during decoding.

In a seventh aspect, an implementation of the present disclosure further provides an encoder, including: a first memory configured to store executable instructions; and a first processor configured to implement the method according to the first aspect or the method according to the second aspect when executing the executable instructions stored in the first memory.

In an eighth aspect, an implementation of the present disclosure further provides a decoder, including: a second memory configured to store executable instructions; and a second processor configured to implement the method according to the third aspect when executing the executable instructions stored in the second memory.

In a ninth aspect, an implementation of the present disclosure provides a computer-readable storage medium, which is applied for encoding, wherein the computer-readable storage medium includes executable instructions stored thereon, and the method according to the first aspect or the method according to the second aspect is implemented when the executable instructions are executed by a first processor.

In a tenth aspect, an implementation of the present disclosure provides a computer-readable storage medium applied to a decoder, wherein the computer-readable storage medium includes executable instructions stored thereon, and the method according to the third aspect is implemented when the executable instructions are executed by a second processor.

The implementations of the present disclosure provide a transform method, an inverse transform method, an encoder, a decoder, and a storage medium, including: a normal vector of an encoding point in an encoding point cloud is determined; a sum of each coordinate of the normal vector is counted based on the normal vector of the encoding point; and a transform order is determined based on the sum of each coordinate of the normal vector. According to the above technical implementation solutions, since in a encoding process of attribute, aiming at realization of RAHT transform, an encoder counts a sum of each coordinate of a normal vector of each coordinate through a normal vector of an encoding point, then a transform order of RAHT transform is determined based on the sum of each coordinate of the normal vector finally. In this way, considering accumulation of normal vectors, transform in a direction with a significant feature is prioritized, thus achieving purposes of reducing redundancy of transform coefficients obtained through transform and improving an encoding and decoding efficiency.

DETAILED DESCRIPTION

In order to understand features and technical contents of implementations of the present disclosure in more detail, realizations of the implementations of the present disclosure will be described in detail below in combination with the accompanying drawings, the accompanying drawings are for reference only but are not intended to limit the implementations of the present disclosure.

In an implementation of the present disclosure, in an encoder framework of point cloud G-PCC, a point cloud input into a 3D picture model is partitioned into slices, and then each slice is encoded independently.

Figure 1:
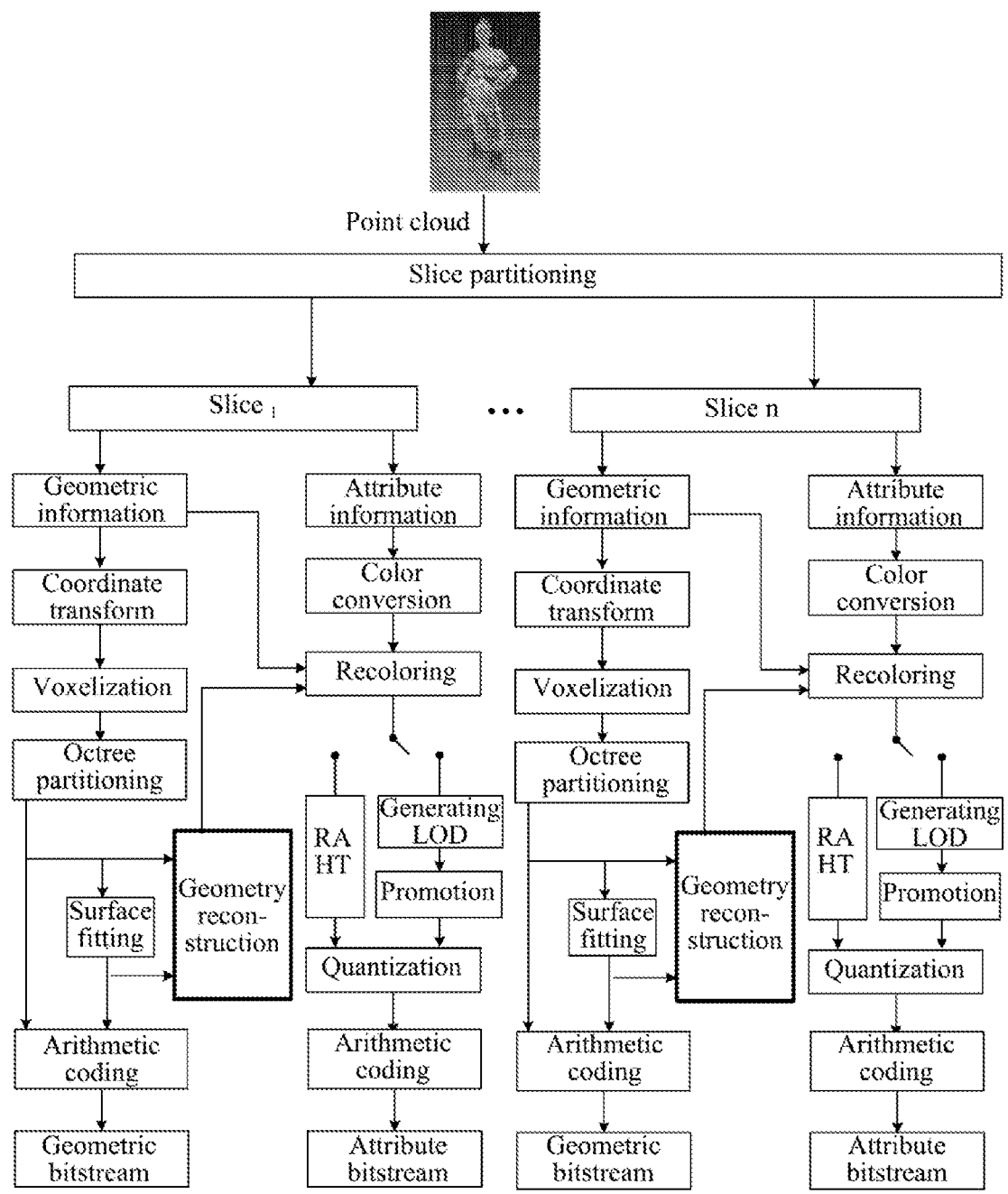
FIG. 1 is a block diagram of an exemplary coding flow according to an implementation of the present disclosure.

In a flow chart of G-PCC coding shown in FIG. 1, it is applied to a point cloud encoder. Aiming at encoding point cloud data, the point cloud data is partitioned into multiple slices through slice partitioning. In each slice, geometric information of a point cloud and attribute information corresponding to each point cloud are encoded separately. In a process of geometric coding, coordinate transform is performed on geometric information, so that all point clouds are contained in a bounding box, and then quantization is performed. The quantization step mainly plays a role of scaling. Because of quantization rounding, geometric information of some point clouds is the same, whether to remove duplicate points is determined based on a parameter. A process of quantization and removal of duplicate points is also called a voxelization process. Then, octree partitioning is performed on the bounding box. In a process of geometric information coding based on an octree, the bounding box is partitioned into eight equal sub-cubes (i.e., eight equal parts), and non-empty sub-cubes (including points in a point cloud) are continued to be partitioned into eight equal parts, until a leaf node obtained after partitioning is a 1×1×1 unit cube, and points in the leaf nodes are arithmetically encoded to generate a binary geometric bitstream, namely a geometric bitstream. In a process of geometric information coding based on triangular soup (trisoup), octree partitioning is also needed first, but unlike geometric information coding based on an octree, the trisoup does not need to partition a point cloud into unit cubes with a side length of 1×1×1 step by step, but stops partitioning when a side length of a block (sub-block) is W. Based on a surface formed with distribution of a point cloud in each block, at most twelve vertexes generated by the surface and twelve sides of the block are obtained, and the vertexes are arithmetically encoded (surface fitting based on vertexes) to generate a binary geometric bitstream, namely a geometric bitstream. Vertex is also used in a process of geometric reconstruction, and reconstructed geometric information is used when encoding attributes of a point cloud.

In a coding process of attribute, geometric coding is completed, and after geometric information is reconstructed, color conversion is performed, and color information (i.e. attribute information) is converted from an RGB color space to a YUV color space. Then, the reconstructed geometric information is used for recoloring a point cloud, so that uncoded attribute information corresponds to the reconstructed geometric information. In a coding process of color information, there are mainly two transform methods, one is distance-based promotion transform which depends on Level of Detail (LOD) partitioning, and the other is Region Adaptive Hierarchical Transform (RAHT) which is directly performed. According to both of the two methods, color information is transformed from a spatial domain to a frequency domain, high-frequency and low-frequency coefficients are obtained through transform, and finally the coefficients are quantized (i.e., quantized coefficients). Finally, geometry coding data obtained after octree partitioning and surface fitting and processing attribute coding data of quantized coefficients are subjected to slice synthesis, and then a vertex coordinate of each block is encoded in turn (i.e., arithmetic coding) to generate a binary attribute bitstream, i.e., an attribute bitstream.

Figure 2:
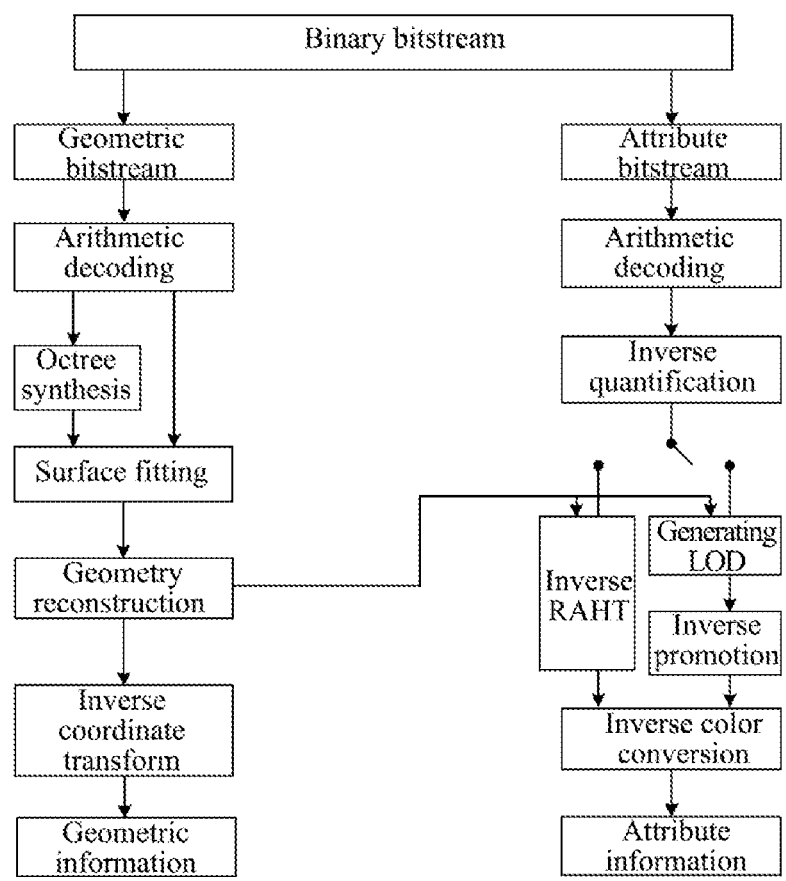
FIG. 2 is a block diagram of an exemplary decoding flow according to an implementation of the present disclosure.

A flow chart of G-PCC decoding shown in FIG. 2 is applied to a point cloud decoder. The decoder acquires a binary bitstream, and decodes a geometric bitstream and an attribute bitstream in the binary bitstream separately. When decoding the geometric bitstream, geometric information of a point cloud is obtained through arithmetic decoding-octree synthesis-surface fitting-geometry reconstruction-inverse coordinate transform. When decoding the attribute bitstream, attribute information of a point cloud is obtained through arithmetic decoding-inverse quantization-LOD-based inverse promotion or RAHT-based inverse transform-inverse color conversion, and a 3D picture model of encoding point cloud data is restored based on geometric information and attribute information.

In a coding process of attribute, RAHT transform is performed after a point cloud is recolored, at this time, geometric coordinate information of the point cloud may be obtained. A Morton code corresponding to each point in a point cloud may be obtained by using coordinate information of the point. Morton coding is also called z-order code, since its coding order follows a spatial z-order. A specific method of calculating a Morton code is described as follows. For a three-dimensional coordinate where each component is represented by a d-bit binary number, its three components are represented as follows: $x = \sum_{\ell=1}^{d} 2^{d-\ell} x_\ell$, $y = \sum_{\ell=1}^{d} 2^{d-\ell} y_\ell$, $z = \sum_{\ell=1}^{d} 2^{d-\ell} z_\ell$.

Herein $x_\ell$, $y_\ell$, $z_\ell \in \{0,1\}$ are binary values corresponding to highest bits ($\ell = 1$) to lowest bits ($\ell = d$) of x, y, z respectively. For x, y, z, the Morton code M is starting from a highest bit and arranging $x_\ell$, $y_\ell$, $z_\ell$ to a lowest bit sequentially and alternatively. A calculation formula of M is as follows.

$$M = \sum_{\ell=1}^{d} 2^{3(d-\ell)}(4 x_\ell + 2 y_\ell + z_\ell) = \sum_{\ell'=1}^{3d} 2^{3d-\ell'} m_{\ell'} \qquad (1)$$

Herein $m_{\ell'} \in \{0,1\}$ is a value from a highest bit ($\ell' = 1$) to a lowest bit ($\ell' = 3d$) of After obtaining a Morton code M of each point in a point cloud, points in the point cloud are arranged in an order of Morton code from small to large, and a weight w of each point is set as 1. It is expressed as a computer language, which is similar to a combination of z|(y<<1)|(x<<2).

Figures 3A, 3B:
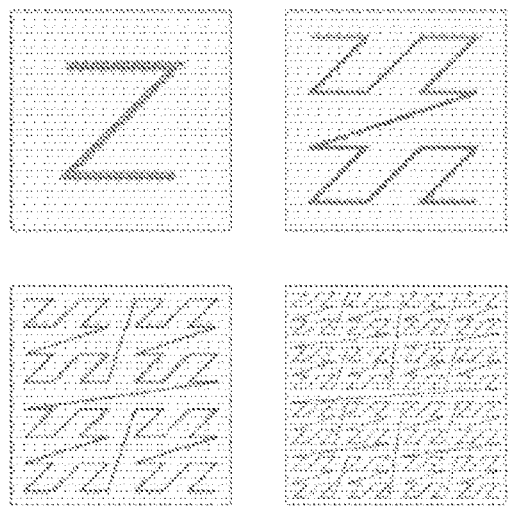
FIG. 3A is a first schematic diagram of an exemplary two-dimensional Morton coding according to an implementation of the present disclosure.
FIG. 3B is a second schematic diagram of an exemplary two-dimensional Morton coding according to an implementation of the present disclosure.

With reference to FIGS. 3A and 3B, it will be illustrated with an order from high to low as z, y, x(x|(y<<1)|(z<<2)), for example.

FIG. 3A shows spatial coding of each pixel in an 8*8 picture, from 000000 to 111111, one-dimensional binary numbers are used for encoding coordinates of x and y values at positions from 0 to 7. Binary coordinate values are interleaved to obtain a binary z-value diagram. The z-shape is connected along a numerical direction to generate a recursive z-shape curve. A z value is placed at each position in the figure according to a connection order. Actually, the above figure is generated iteratively in a z direction, from 00-11 (one z in a whole figure), from 0000-1111 (one z is put at each point of a previous z), and from 0000000-111111 (one z is put at each point of a previous z), two bits are added each time, and recursion rises.

Illustratively, as shown in FIG. 3B, spatial coding orders of 2×2, 4×4, 8×8, and 16×16 are shown, from which it may be seen that a coding order of Morton codes is realized according to a spatial z-order.

Figure 4A:
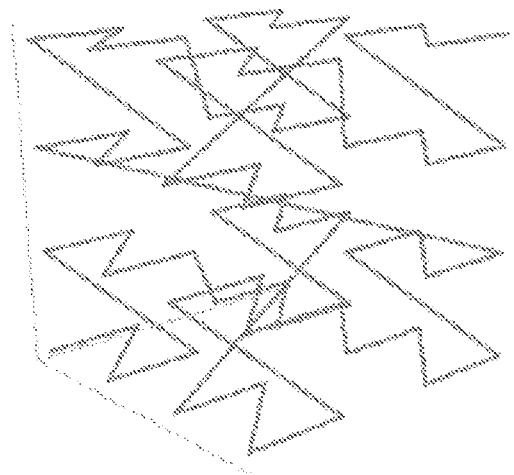
FIG. 4A is a first schematic diagram of an exemplary three-dimensional Morton coding according to an implementation of the present disclosure.
Figure 4B:
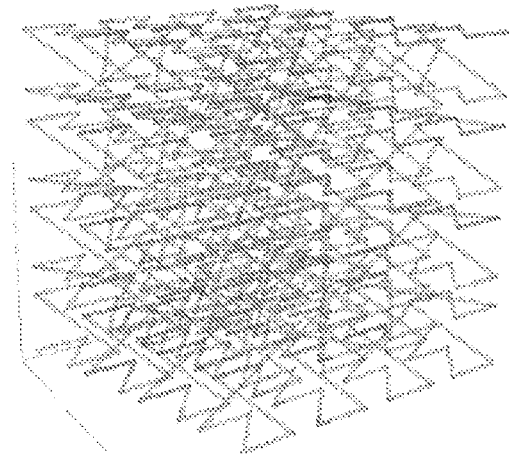
FIG. 4B is a second schematic diagram of an exemplary three-dimensional Morton coding according to an implementation of the present disclosure.

When rising to 3D, a recursive process is shown in FIG. 4A and FIG. 4B, which realizes coordinate interleaving, and what is done in all is to disperse coordinate values continuously. x|(y<<1)|(z<<2); that is, each coordinate value is dispersed, and they are interleaved in turn, first z, then y, and finally x. A decoding process is an aggregation process.

Figure 5:
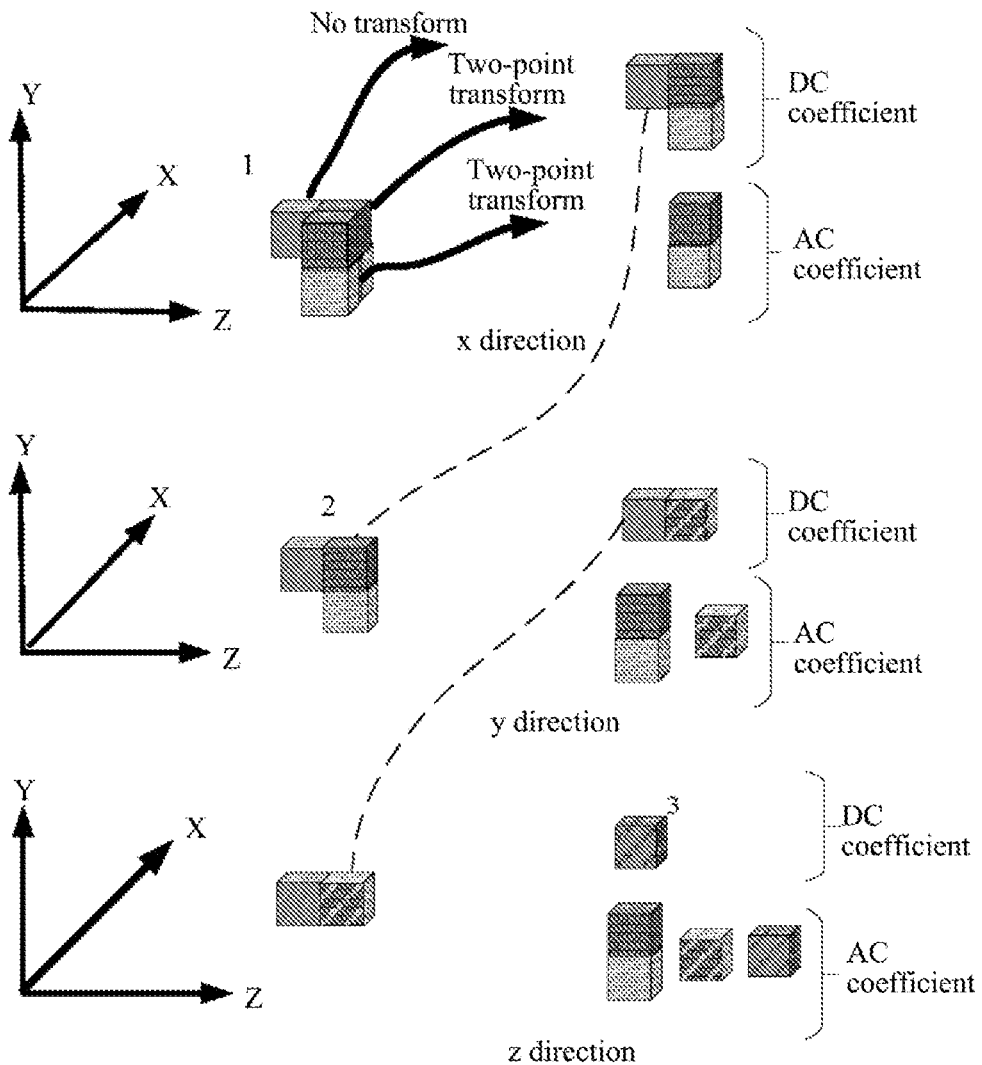
FIG. 5 is a schematic diagram of an exemplary hierarchical RAHT transform according to an implementation of the present disclosure.

RAHT transform is performed on a basis of a hierarchical structure obtained through octree partitioning performed on point cloud data, starting from a bottom layer of an octree and transforming hierarchically. As shown in FIG. 5, a voxel block 1 is obtained after octree partitioning is completed (i.e. a three-color depth-interleaved geometry in FIG. 5, and each square represents a point in a point cloud). RAHT transform is performed from a lowest layer, and taking a transform order xyz as an example, the RAHT transform is performed along an x direction as shown in FIG. 5 below. If there are adjacent voxel blocks in the x direction, RAHT is performed on the two to obtain average (a DC coefficient) and detail (an AC coefficient) of attribute values of two adjacent points. Among them, the obtained DC coefficient exists as attribute information of a voxel block 2 of a parent node, and RAHT transform of a next layer is performed, while the AC coefficient is reserved for final coding. If there is no adjacent point, an attribute value of the voxel block is directly transferred to a parent node of a second layer.

RAHT transform of the second layer is performed along a y direction. If there are adjacent voxel blocks in the y direction, RAHT is performed on the two to obtain average (a DC coefficient) and detail (an AC coefficient) of attribute values of two adjacent points. After that, RAHT transform of a third layer is performed along a z direction, and a voxel block 3 of a parent node with three-color depth-interleaved is obtained as a child node of a next layer in an octree, and then RAHT transform is circularly performed along the x, y, and z directions until there is only one parent node in a whole point cloud.

In practice, when traversing points in a point cloud, ordered Morton codes of the point cloud are used, this is convenient for combination of adjacent points in an octree as shown in the figure.

For attribute values $c_1$, $c_2$ of two adjacent points, a specific RAHT transform process is as follows.

$$\begin{bmatrix} DC \\ AC \end{bmatrix} = \begin{bmatrix} 1-b & b \\ -\frac{1}{a} & \frac{1}{a} \end{bmatrix} \begin{bmatrix} c_1 \\ c_2 \end{bmatrix} \quad (2)$$

Herein $w = w_1 + w_2$, $b = \frac{w_1}{w_1 + w_2}$, $a = \sqrt{(\text{luma})^2 \frac{w_1 + w_2}{w_1 \cdot w_2}}$, luma is obtained through incoming quantization parameter configuration, and w is a weight corresponding to a DC coefficient and is obtained through calculation. The DC coefficient is a weighted average value of attributes, and an AC coefficient is an attribute residual of two adjacent points. $c_1$, $c_2$ are attribute values correspond to $w_1$ and $w_2$ in a first layer, and are used for DC coefficient values obtained through calculation in another layer.

In an implementation of the present disclosure, specific acts of RAHT transform are as follows.

(1) Attribute values of points in a point cloud are taken as DC coefficients of a first layer, and weights of all the DC coefficients are set as 1, and RAHT transform is started.

(2) The DC coefficients and AC coefficients of this layer are filled into a parent layer of a next layer and parent nodes according to corresponding indexes. If there is no AC coefficient, no filling operation is performed.

(3) DC coefficients corresponding to indexes are traversed according to the indexes sorted through Morton codes.

(4) Merton codes corresponding to all DC coefficients are shifted right by one bit, at this time a Morton code of each DC coefficient represents a Morton code of its parent node.

Figure 6:
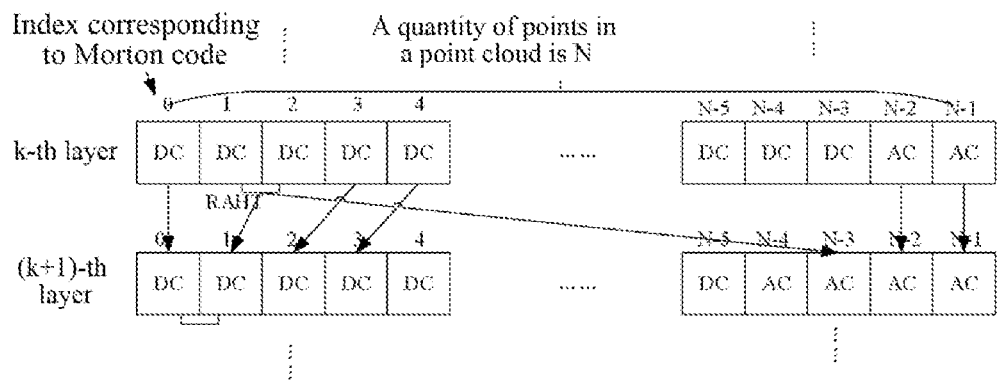
FIG. 6 is a schematic diagram of storing a transform coefficient of an exemplary hierarchical RAHT transform according to an implementation of the present disclosure.

(5) As shown in FIG. 6, it is determined whether Morton codes of two DC coefficients are the same, if they are the same, it means that RAHT is performed on the two under a same parent node, an obtained DC coefficient is filled in a position of a DC coefficient of a parent node of a next layer, an AC coefficient is filled in a position of a last DC coefficient of the next layer, and a weight of a sum of the two DC coefficients is assigned to the DC coefficient of the parent node; if they are different, the DC coefficient and its weight will be directly filled into the next layer.

(6) Acts (2)-(5) are repeated until a certain layer has only one DC coefficient.

(7) Finally, the DC coefficient is quantized, and attribute values of the DC coefficient and AC coefficient of this layer are encoded.

Accordingly, in a decoder block diagram, a transform order of RAHT also needs to be used in inverse RAHT transform.

The following describes a decoding process of RAHT.

An RAHT decoding process is inverse transform of an RAHT coding process. The same as a coding process, before inverse transform, a Morton code of each point is calculated in a point cloud, and after obtaining a Morton code M of each point, points in the point cloud are arranged in an order from small to large, and a weight of each point is set to 1. An inverse RAHT process traverses all points in the point cloud according to an order after sorting by Morton codes.

As RAHT transform is performed hierarchically, starting from a bottom layer, adjacent points in a point cloud are determined layer by layer, and the RAHT transform is performed on attribute values according to weights. A process of inverse RAHT transform starts from a top layer and inverse RAHT transform is performed from top to bottom, so weight information of each layer needs to be obtained before inverse RAHT transform.

Before performing inverse RAHT transform, obtained Morton code information is used, from a bottom layer, for making a determination on RAHT adjacent nodes of each layer in a coding end, and weight information of each layer and a corresponding position of an AC coefficient may be obtained. For each layer of RAHT, a corresponding Morton code is shifted left by one bit. The weight information and Morton code information corresponding to nodes in each layer are recorded in a buffer, which is convenient for later use.

Figure 7:
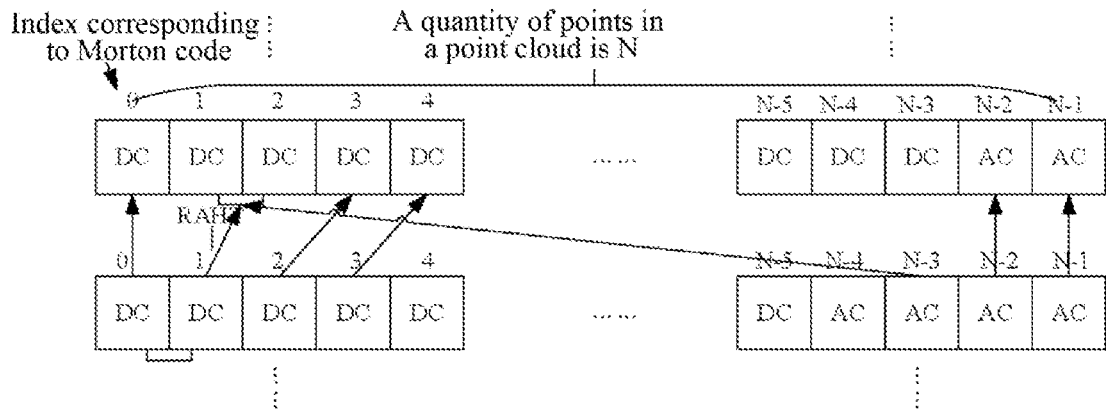
FIG. 7 is a schematic diagram of storing a transform coefficient of an exemplary hierarchical inverse RAHT transform according to an implementation of the present disclosure.

In inverse RAHT transform, starting from a top layer, adjacent nodes are determined according to Morton code information of each layer, and the inverse RAHT transform is performed by using obtained weight information and decoded attribute information. As shown in FIG. 7, inverse RAHT transform is equivalent to a process from a (k+1)-th layer to a k-th layer. When adjacent nodes are determined, traversed DC coefficients and corresponding AC coefficients are used for performing the inverse RAHT transform.

More specifically, a specific inverse RAHT transform process for attribute values $c_1$, $c_2$, of two adjacent points is as follows.

$$\begin{bmatrix} c_1 \\ c_2 \end{bmatrix} = \begin{bmatrix} 1 & -ab \\ 1 & a(1-b) \end{bmatrix} \begin{bmatrix} DC \\ AC \end{bmatrix} \quad (3)$$

Based on background of the above introduction, a transform method is described in the following according to an implementation of the present disclosure, which is mainly applied to an encoder (a point cloud encoder) in view of different ways of determining a transform order during RAHT transform in an encoder framework.

Figure 8A:
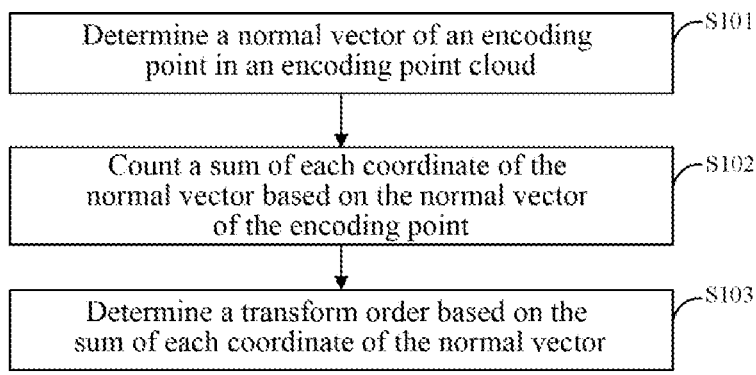
FIG. 8A is a first flow chart of a transform method according to an implementation of the present disclosure.

As shown in FIG. 8A, an implementation of the present disclosure provides a transform method, which may include following acts S101-S103.

In S101, a normal vector of an encoding point in an encoding point cloud is determined.

In S102, a sum of each coordinate of the normal vector is counted based on the normal vector of the encoding point.

In S103, a transform order is determined based on the sum of each coordinate of the normal vector.

Figure 8B:
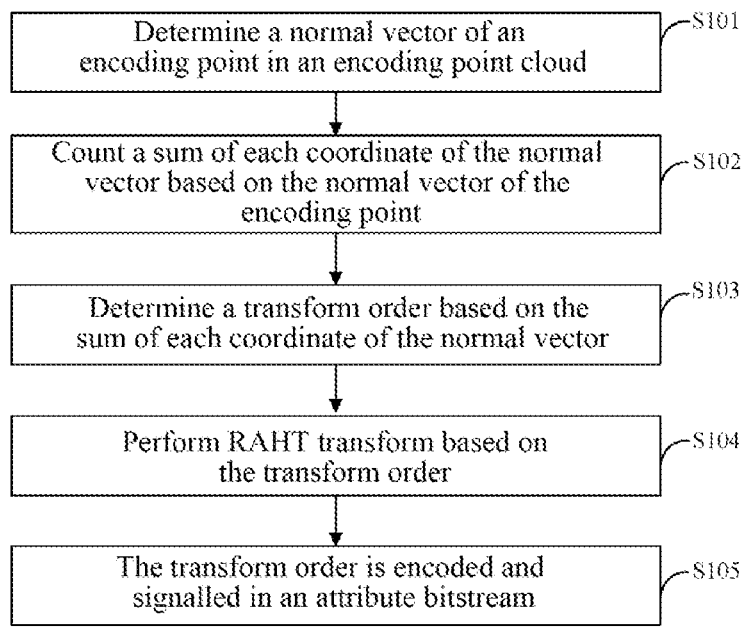
FIG. 8B is a second flow chart of a transform method according to an implementation of the present disclosure.

In some implementations of the present disclosure, as shown in FIG. 8B, after the act S103, acts S104-105 are further included.

In S104, RAHT transform is performed based on the transform order.

In S105, the transform order is encoded and signalled in an attribute bitstream.

A transform method according to an implementation of the present disclosure is an RAHT transform method considering spatial distribution of point clouds and surface orientation, instead of adopting a fixed transform order, it analyzes a block to be transformed and spatial distribution of point clouds contained in a preset neighborhood range before RAHT transform, and determines an RAHT transform order according to a result of the analysis, thus obtaining better coding performance.

In an implementation of the present disclosure, an encoding point cloud is point cloud data of the encoding point cloud for an encoding object in the present disclosure. For one encoding point cloud, it may contain N points, that is, N encoding points. N is greater than or equal to 1. By determining a normal vector of an encoding point in an encoding point cloud, an encoder may count a sum of each coordinate of the normal vector in a three-dimensional space based on the normal vector of the encoding point, the sum of each coordinate of the normal vector represents characteristics of main distribution concentration of the encoding point cloud in the three-dimensional space. Since different point clouds have different spatial distributions, before RAHT transform is performed, an encoder may determine a transform order suitable for its own distribution characteristics according to spatial distribution characteristics of each encoding point cloud, so that transform coefficients obtained through RAHT transform performed by the encoder based on the transform order are less redundant, and then a coding efficiency may be improved.

It should be noted that, in an implementation of the present disclosure, since a determined transform order of each encoding point cloud may be different, when the transform order is determined, an encoder needs to signal the transform order in an attribute bitstream in an encoding process. For example, this order may be transmitted to a decoder with a 3-bit bitstream, which is convenient for the decoder to directly parse to obtain a transform order of RAHT during decoding.

In an implementation of the present disclosure, encoding points are multiple objects in an encoding point cloud, and an encoder may count a sum of various coordinates of an x-axis normal vector on an x-coordinate of multiple encoding points, a sum of various coordinates of a y-axis normal vector on a y-coordinate of multiple encoding points, and a sum of various coordinates of a z-axis normal vector on a z-coordinate of multiple encoding points based on a normal vector of each encoding point. Then, according to distribution densities or distribution sizes of the sum of various coordinates of the x-axis normal vector, the sum of various coordinates of the y-axis normal vector, and the sum of various coordinates of the z-axis normal vector, the encoder may determine an order which a density or accumulation of a normal vector is larger, and thus obtain a transform order, wherein the transform order corresponds to a distribution order of normal vectors from more to less.

In an implementation of the present disclosure, a method for determining a transform order is as follows: an encoder counts a sum of an absolute value of each coordinate of a normal vector based on the normal vector of an encoding point, the sum of the absolute value represents a sum of each coordinate of the normal vector; the encoder sorts the sum of the absolute value in an order from large to small, and determines a transform order.

It should be noted that, in an implementation of the present disclosure, implementation of counting a sum of an absolute value of each coordinates of a normal vector by an encoder is that counting is performed on all normal vectors for each coordinate first and then normalization is performed, and then the sum of absolute value is counted. Normal vectors in an implementation of the present disclosure are all normalized normal vectors for use.

Illustratively, an encoder counts a sum of absolute values of projections of normal vectors on an x-axis, a y-axis, and a z-axis for the normal vectors of N encoding points, and if a sum of absolute values in the x-axis is $\Sigma X$; a sum of absolute values of the y axis is $\Sigma |Y|$; and a sum of absolute values of the z axis is $\Sigma |Z|$, then the following is acquired.

When $\Sigma |X| > \Sigma |Y| > \Sigma |Z|$, a transform order is xyz; when $\Sigma |X| > \Sigma |Z| > \Sigma |Y|$, a transform order is xzy; when $\Sigma |Y| > \Sigma |Z| > \Sigma |X|$, a transform order is yzx; when $\Sigma |Y| > \Sigma |X| > \Sigma |Z|$, a transform order is yxz; when $\Sigma |Z| > \Sigma |Y| \Sigma |X|$, a transform order is zyx; and when $\Sigma |Z| > \Sigma |X| > \Sigma |Y|$, a transform order is zxy.

It may be understood that an encoder uses a normal vector estimation method to obtain normal vector information of each point. According to an obtained sum of normal vectors in different directions, an RAHT transform direction order is determined, that is, through analyzing spatial distribution of an encoding point cloud, an RAHT transform order is obtained by performing a normal vector pre-estimation on an encoding point cloud and calculating a sum in each direction, which improves a coding efficiency and coding performance of a G-PCC attribute coding part.

Figure 9:
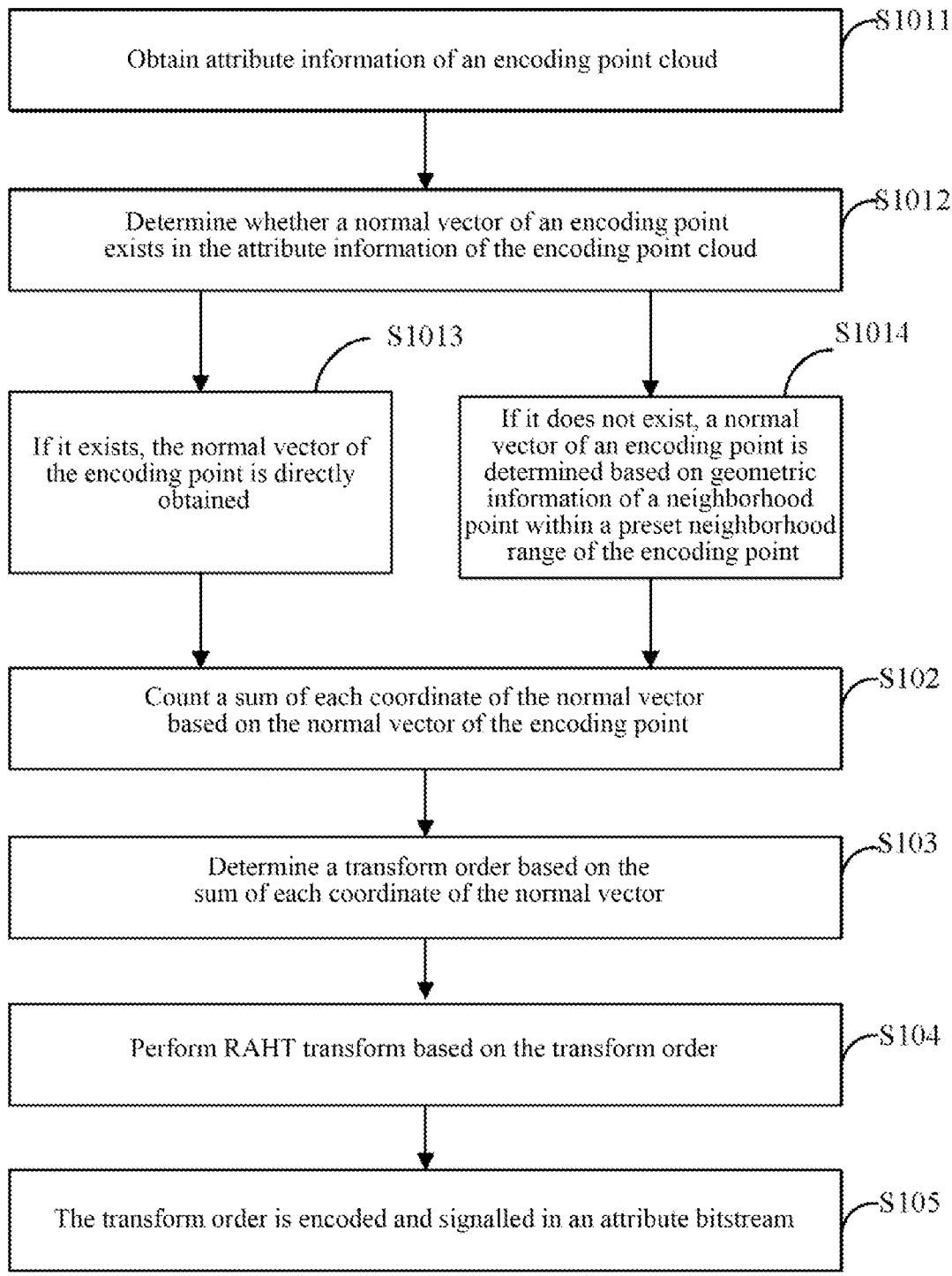
FIG. 9 is a third flow chart of a transform method according to an implementation of the present disclosure.

In some implementations of the present disclosure, based on FIG. 8B and as shown in FIG. 9, specific implementation of the act S101 includes acts S1011-S1014 as follows.

In S1011, attribute information of an encoding point cloud is obtained.

In S1012, it is determined whether a normal vector of an encoding point exists in the attribute information of the encoding point cloud.

In S1013, if it exists, the normal vector of the encoding point is directly obtained.

In S1014, if it does not exist, a normal vector of an encoding point is determined based on geometric information of a neighborhood point within a preset neighborhood range of the encoding point.

In an implementation of the present disclosure, when an encoder performs attribute coding, attribute information may be obtained from header information of an encoding point cloud, and the attribute information here may include color information of a point and additional normal vector information. That is to say, in an implementation of the present disclosure, for an encoding point in an encoding point cloud, attribute information parsed by an encoder may include some normal vectors of the encoding point in the encoding point cloud, or may include all, part or none of them. In view of these situations, an encoder may detect obtained attribute information of an encoding point cloud, and determine whether a normal vector of an encoding point exists in the attribute information of the encoding point cloud for each encoding point. If it exists, the normal vector of the encoding point is directly obtained from the attribute information; at the same time, the encoder may also obtain geometric information of the encoding point cloud, that is, obtain spatial coordinate information of the encoding point. If it does not exist, a normal vector of an encoding point is determined based on geometric information of a neighborhood point within a preset neighborhood range of the encoding point.

That is to say, an encoding point of its corresponding normal vector is not found in attribute information, so it needs to be obtained by normal vector estimation.

Figure 10:
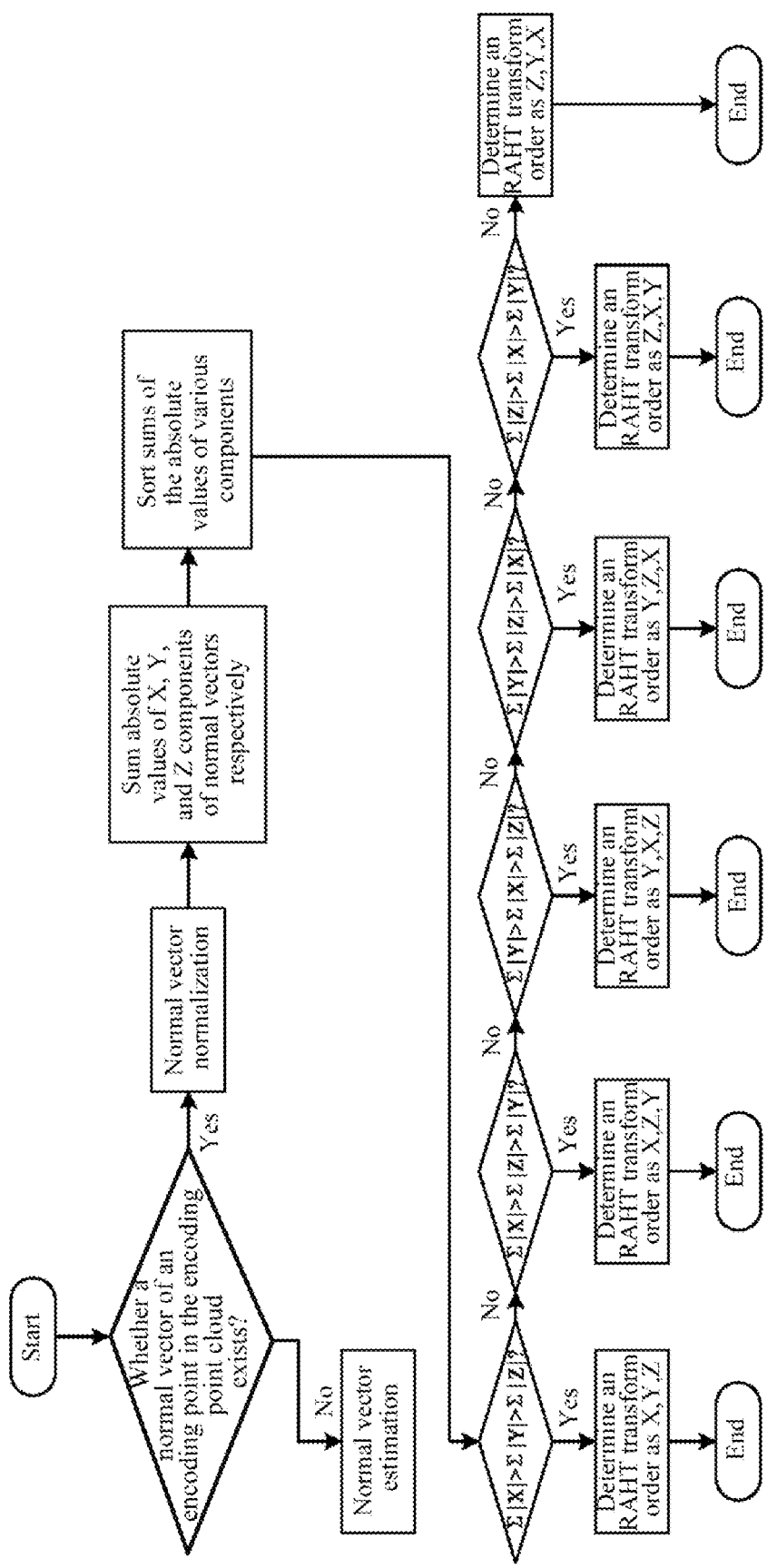
FIG. 10 is a schematic flow chart of an exemplary transform order according to an implementation of the present disclosure.

For example, as shown in FIG. 10, an encoding point cloud contains N points, and attribute information corresponding to each point is $A_n$, n=1, 2, ... N. An encoder traverses attribute information for determining whether a normal vector of an encoding point in the encoding point cloud exists, to decide whether there is a normal vector for each point in the point cloud. If it exists, the normal vector is obtained directly; if it does not exist, a normal vector is obtained through normal vector estimation, after normalizing a normal vector of each coding point, for all normal vectors, a sum of absolute values of projections of normal vectors on an x-axis, a y-axis, and a z-axis is directly counted; if a sum of absolute values on the x-axis is $\Sigma X$; a sum of absolute values on the y axis is $\Sigma|Y|$; a sum of absolute values on the z axis is $\Sigma|Z|$, the sums of absolute values are sorted from large to small, then when $\Sigma|X|>\Sigma|Y|>\Sigma|Z|$, a transform order is xyz; when $\Sigma|X|>\Sigma|Z|>\Sigma|Y|$, a transform order is xzy; when $\Sigma|Y|>\Sigma|Z|>\Sigma|X|$, a transform order is yzx; when $\Sigma|Y|>\Sigma|X|>\Sigma|Z|$, a transform order is yxz; when $\Sigma|Z|>\Sigma|Y|\Sigma|X|$, a transform order is zyx; and when $\Sigma|Z|>\Sigma|X|>\Sigma|Y|$, a transform order is zxy.

Illustratively, an expression mode of a normal vector mentioned in an implementation of the present disclosure may be $Norm_n=(normX_n, normY_n, normZ_n)$ If an encoding point cloud contains a normal vector of each point, $Norm_n$, n=1, 2, 3 ... N is normalized respectively, that is, $$Norm'_n = \left( \frac{normX_n}{\|Norm_n\|}, \frac{normY_n}{\|Norm_n\|}, \frac{normZ_n}{\|Norm_n\|} \right),$$

wherein $\|Norm_n\| = \sqrt{normX_n^2 + normY_n^2 + normZ_n^2}$, thus shows a normal vector of an encoding point is represented.

It should be noted that if an encoding point cloud does not contain a normal vector of each point, normal vector information of each point is calculated by using a normal vector estimation method. According to an obtained sum of normal vectors in different directions, an RAHT transform order is determined.

In some implementations of the present disclosure, geometric information includes spatial coordinate information. For a point cloud that does not contain a normal vector of each point, an encoder obtains at least one neighborhood point that is nearest to an encoding point within a preset neighborhood range; obtains geometric information of at least one neighborhood point; determines at least one distance from at least one neighborhood point to a fitted plane according to the geometric information of at least one neighborhood point and a preset fitted surface equation; and obtains a system eigenvector corresponding to the preset fitted surface equation according to minimization of a square sum of at least one distance. The system eigenvector is used as a normal vector of the encoding point.

In some implementations of the present disclosure, an encoder also determines a normal vector of an encoding point based on attribute information of a neighborhood point within a preset neighborhood range of the encoding point. For example, when attribute information contains a normal vector of at least one neighborhood point, an encoder may obtain the normal vector of at least one neighborhood point from the attribute information; then determine a normal vector of an encoding point based on the normal vector of at least one neighborhood point.

It should be noted that when an encoder only finds a normal vector of one neighborhood point from attribute information, the normal vector of this neighborhood point is determined as a normal vector of an encoding point. When an encoder only finds normal vectors of multiple neighborhood points from attribute information, an average value of the normal vectors of the multiple neighborhood points is determined as a normal vector of an encoding point.

It may be understood that an encoder may use a normal direction of each point to solve spatial distribution of a point cloud, so as to determine an optimal RAHT transform order of RAHT along x, y, and z directions, optimize distribution of AC transform coefficients, remove redundancy of AC coefficients, and thus improve a coding efficiency.

Figure 11:
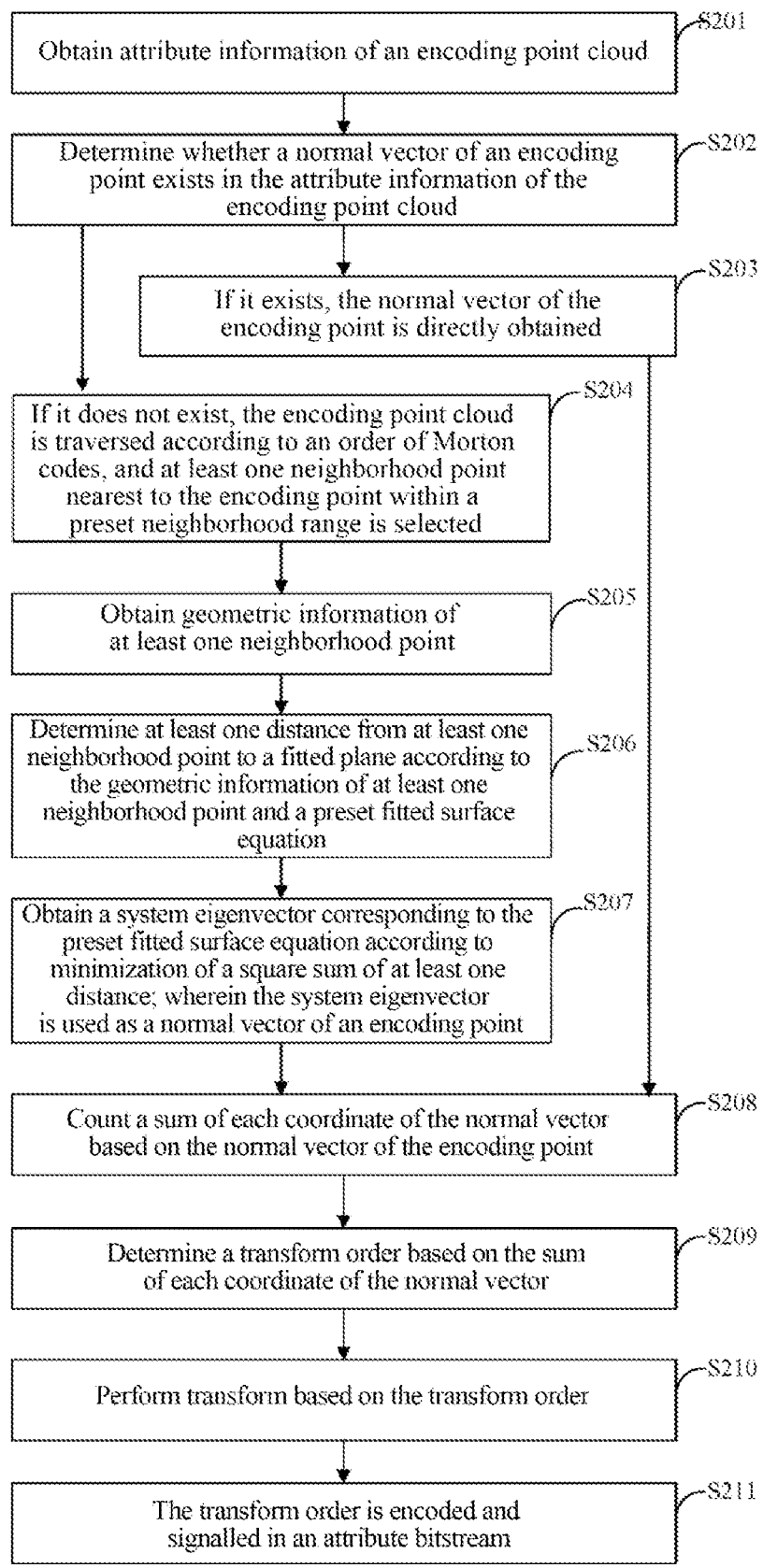
FIG. 11 is a fourth flow chart of a transform method according to an implementation of the present disclosure.

As shown in FIG. 11, an implementation of the present disclosure provides a transform method, which may include following acts S201 to S207.

In S201, attribute information of an encoding point cloud is obtained.

In S202, it is determined whether a normal vector of an encoding point exists in the attribute information of the encoding point cloud.

In S203, if it exists, the normal vector of the encoding point is directly obtained.

It should be noted that implementation of S201-S203 here is consistent with the description of implementation of S1011-S1013 in the foregoing implementation, and will not be repeated here.

In S204, if it does not exist, the encoding point cloud is traversed according to an order of Morton codes, and at least one neighborhood point nearest to the encoding point within a preset neighborhood range is selected.

In S205, geometric information of at least one neighborhood point is obtained.

In S206, at least one distance from at least one neighborhood point to a fitted plane is determined according to the geometric information of at least one neighborhood point and a preset fitted surface equation.

In S207, a system eigenvector corresponding to the preset fitted surface equation is obtained according to minimization of a square sum of at least one distance; wherein the system eigenvector is used as a normal vector of an encoding point.

In an implementation of the present disclosure, for a point cloud that does not contain a normal vector of each point, a normal vector estimation method that may be adopted is a method for obtaining a normal vector based on a Principal Components Analysis (PCA) method of local surface fitting, and a Singular Value Decomposition (SVD) normal vector estimation method may also be adopted.

The preset fitted surface equation includes: a plane equation that does not cross an origin and a plane equation that crosses the origin. When a preset fitted surface equation adopted by an encoder is a plane equation that does not cross an origin, estimation of a normal vector through a Principal Components Analysis (PCA) method is achieved. When a preset fitted surface equation adopted by an encoder is a plane equation that crosses the origin, SVD normal vector estimation is achieved.

According to a Principal Components Analysis (PCA) method, when estimating a normal vector of each encoding point in an encoding point cloud, spatial coordinate information of another point within a preset neighborhood of the point needs to be used, that is, spatial coordinate information of a neighborhood point, which may be obtained from geometric information. A fast K-nearest neighbor search method is adopted. A Morton code of each point is calculated for an encoding point cloud, Morton codes of encoding points in the encoding point cloud are arranged in an order from small to large, and an order of the Morton codes is obtained. According to the order of the Morton codes, for each point, K nearest points are selected from a certain range of points around the order (within a preset neighborhood range) as its K nearest neighbors.

It should be noted that the preset neighborhood range is not limited in an implementation of the present disclosure, and an actual setting range shall prevail. Selections for at least one neighborhood point K may be different. The smaller the K is, the smaller the calculation complexity is, and an error of an obtained normal vector will be larger. The larger the K is, the greater the calculation complexity is when solving a normal direction, but an error of the solved normal direction is smaller.

Illustratively, for selected K neighborhood points, of which spatial coordinate information is $(x_i,y_i,z_i)$, i= 1, 2, 3 ... K, and it is assumed that a preset fitted surface equation is x+by +cz=d(d>0), wherein $a^2+b^2+c^2=1$. An encoder determines at least one distance from at least one neighborhood point to a fitted plane according to spatial coordinate information of the at least one neighborhood point and the preset fitted surface equation, wherein a distance from any point $(x_i,y_i,z_i)$ to the plane is $d_i=|ax_i+by_i+cz_i-d|$.

In order to obtain an optimal fitted surface, a square sum of the at least one distance is minimized, that is= $\Sigma_{i=1}^{K}d_i^2=\Sigma_{i=1}^{K}|ax_i+by_i+cz_i-d|^2 \to$ min. A specific solving process is changed to: when $f=\Sigma_{i=1}^{K}d_i^2-\lambda(a^2+b^2+c^2-1)$ is set, an extreme value of f is obtained. The solving process is as follows.

An encoder may know through simple calculation that a centroid of a locally fitted surface passing through K neighborhood is $$\bar{x} = \frac{\Sigma_{i=1}^{K}x_i}{K}, \bar{y} = \frac{\Sigma_{i=1}^{K}y_i}{K}, \bar{z} = \frac{\Sigma_{i=1}^{K}z_i}{K},$$

then $d_i = |a(x_i - \bar{x}) + b(y_i - \bar{y}) + c(z_i - \bar{z})|$.

In order to obtain the extreme value off, partial derivatives of the f are shown in (4), (5), and (6) as follows.

$$\frac{\partial f}{\partial a} = 2\sum_{i=1}^{K}(a\Delta x_i + b\Delta y_i + c\Delta z_i)\Delta x_i - 2\lambda a = 0 \quad (4)$$

$$\frac{\partial f}{\partial b} = 2\sum_{i=1}^{K}(a\Delta x_i + b\Delta y_i + c\Delta z_i)\Delta y_i - 2\lambda b = 0 \quad (5)$$

$$\frac{\partial f}{\partial b} = 2\sum_{i=1}^{K}(a\Delta x_i + b\Delta y_i + c\Delta z_i)\Delta y_i - 2\lambda b = 0 \quad (6)$$

In which $\Delta x_i=x_i-\bar{x}$, $\Delta y_i=y_i-\bar{y}$, $\Delta z_i=z_i-\bar{z}$.

According to combination of formulas (4), (5), and (6), a covariance matrix (7) is obtained as follows.

$$\begin{bmatrix} \Sigma\Delta x_i\Delta x_i & \Sigma\Delta x_i\Delta y_i & \Sigma\Delta x_i\Delta z_i \\ \Sigma\Delta x_i\Delta y_i & \Sigma\Delta y_i\Delta y_i & \Sigma\Delta y_i\Delta z_i \\ \Sigma\Delta x_i\Delta z_i & \Sigma\Delta y_i\Delta z_i & \Sigma\Delta z_i\Delta z_i \end{bmatrix}\begin{bmatrix} a \\ b \\ c \end{bmatrix} = \lambda \begin{bmatrix} a \\ b \\ c \end{bmatrix} \quad (7)$$

In this way, by solving an eigenvalue and an eigenvector of the covariance matrix, the eigenvector is $(a,b,c)^T$, then a normal vector corresponding to a encoding point n in an encoding point cloud may be expressed as $\text{Norm}_n=(\text{NormX}_n,\text{NormY}_n,\text{NormZ}_n)=(a,b,c)$.

Through this Principal Component Analysis (PCA) method, after obtaining normal vectors of all encoding points in the encoding point cloud, and then absolute values of projections of all normal vectors on each direction of x, y, z are summed, and then the summed values are sorted from large to small, and a transform order is obtained.

In view of an SVD normal vector estimation method, a point is selected in K neighborhood, and in this example, K may be selected as 20. Spatial coordinate information of K neighborhood points is selected as: $(x_i,y_i,z_i)$, i=1, 2, 3 ... K. A preset fitted surface equation crosses an origin and is ax+by +cz=0, $a^2+b^2+c^2=1$. An encoder determines at least one distance from at least one neighborhood point to a fitted plane according to spatial coordinate information of the at least one neighborhood point and the preset fitted surface equation, wherein a distance from any point $(x_i,y_i,z_i)$ to the plane is $d_i=|ax_i+by_i+cz_i|$.

In order to obtain an optimal fitted surface, a square sum of the at least one distance is minimized, that is, $e=\Sigma_{i=1}^{K}d_i^2=\Sigma_{i=1}^{K}|ax_i+by_i+cz_i-d|^2 \to$ min. A specific solving process is changed to: when $f=\Sigma_{i=1}^{K}d_i^2$ is set, an extreme value off is obtained. The solving process is as follows.

In order to obtain the extreme value off, partial derivatives of the f are shown in (8), (9), and (10) as follows.

$$\frac{\partial f}{\partial a} = 2\sum_{i=1}^{K}(a\Delta x_i + b\Delta y_i + c\Delta z_i)\Delta x_i = 0 \quad (8)$$

$$\frac{\partial f}{\partial b} = 2\sum_{i=1}^{K}(a\Delta x_i + b\Delta y_i + c\Delta z_i)\Delta y_i = 0 \quad (9)$$

$$\frac{\partial f}{\partial c} = 2\sum_{i=1}^{K}(a\Delta x_i + b\Delta y_i + c\Delta z_i)\Delta z_i = 0 \quad (10)$$

wherein $\Delta x_i = x_i - \bar{x}, \Delta y_i = y_i - \bar{y}, \Delta z_i = z_i - \bar{z}$.

According to combination of formulas (8), (9), and (10), a covariance matrix (11) is obtained as follows.

$$\begin{bmatrix} \Sigma\Delta x_i\Delta x_i & \Sigma\Delta x_i\Delta y_i & \Sigma\Delta x_i\Delta z_i \\ \Sigma\Delta x_i\Delta y_i & \Sigma\Delta y_i\Delta y_i & \Sigma\Delta y_i\Delta z_i \\ \Sigma\Delta x_i\Delta z_i & \Sigma\Delta y_i\Delta z_i & \Sigma\Delta z_i\Delta z_i \end{bmatrix}\begin{bmatrix} a \\ b \\ c \end{bmatrix} = 0 \quad (11)$$

In this way, by solving an eigenvalue and an eigenvector of the covariance matrix, the eigenvector is $(a,b,c)^T$, then a normal vector corresponding to an encoding point n in an encoding point cloud may be expressed as $\text{Norm}_n=(\text{NormX}_n,\text{NormY}_n,\text{NormZ}_n)=(a,b,c)$.

It may be understood that by making a fitting curve close to a plane as much as possible, for an encoder, it is proposed that a normal vector is estimated by means of a plane that crosses an origin and a plane that does not cross the origin, so that normal vector estimation may be accurately achieved in all cases, which improves estimation accuracy of a normal vector, further improves optimality of a transform order, and finally improves coding performance.

In S208, a sum of each coordinate of the normal vector is counted based on the normal vector of the encoding point.

In S209, a transform order is determined based on the sum of each coordinate of the normal vector.

In S210, transform is performed based on the transform order.

In S211, the transform order is encoded and signalled in an attribute bitstream.

It should be noted that an implementation process of S208-S211 here is consistent with the implementation process of S102-105 described above, and will not be repeated here.

Figure 12:
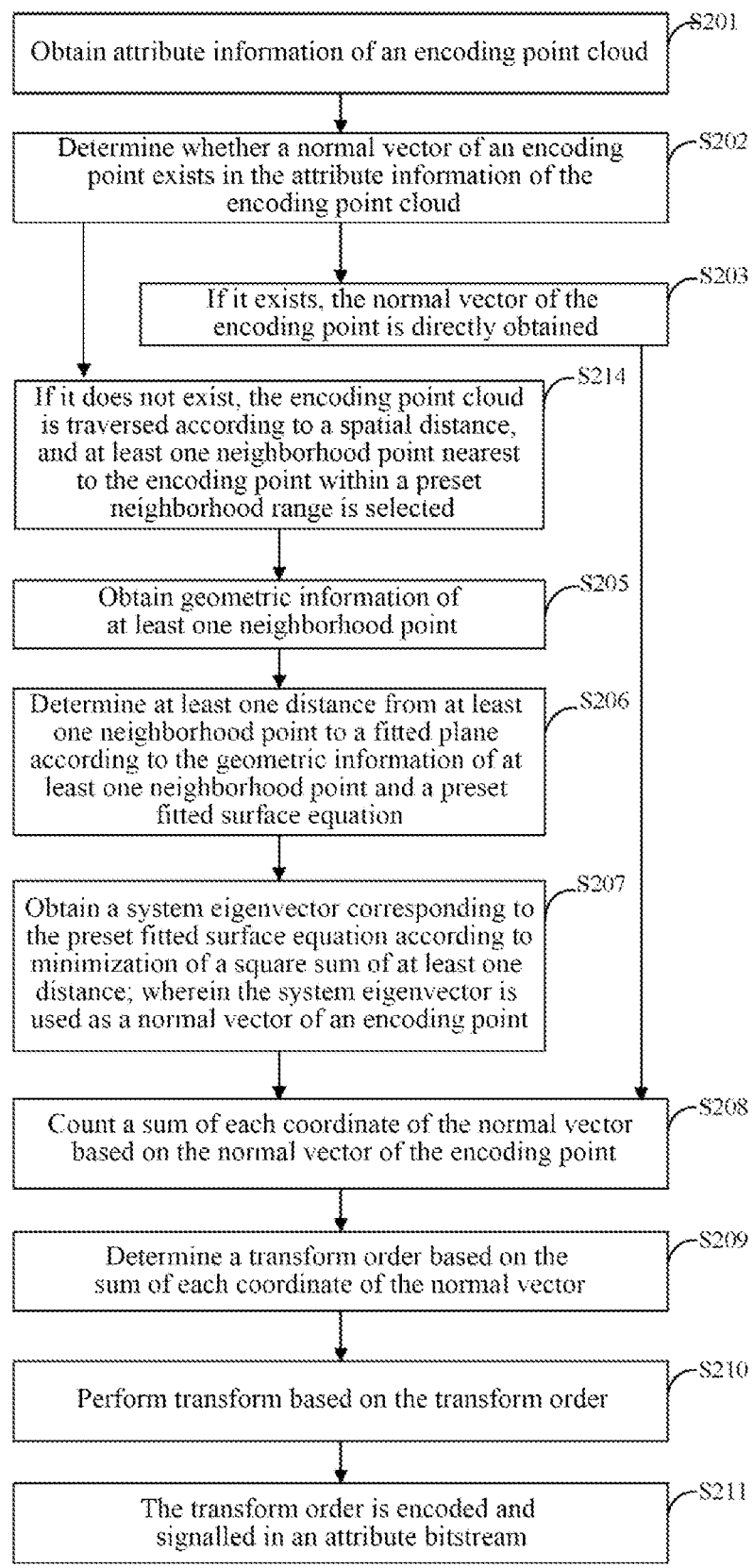
FIG. 12 is a fifth flow chart of a transform method according to an implementation of the present disclosure.

In some implementations of the present disclosure, as shown in FIG. 12, alternative implementation of S204 is S214 as follows.

In S214, if it does not exist, the encoding point cloud is traversed according to a spatial distance, and at least one neighborhood point nearest to the encoding point within a preset neighborhood range is selected.

In an implementation of the present disclosure, for a point cloud that does not contain a normal vector of each point, when an encoder performs K-nearest neighbor search, it may use a search method based on a spatial distance to find K nearest neighborhood points (at least one neighborhood point) with smallest spatial distances. In order to find a neighborhood point of each point accurately, all points in the encoding point cloud may be traversed to perform K-nearest neighbor search.

In detail, all points of the encoding point cloud are traversed, spatial distances between all points and a current encoding point are determined, and one or more of smallest spatial distances are found therefrom, that is, K nearest neighborhood points are determined.

Figure 13:
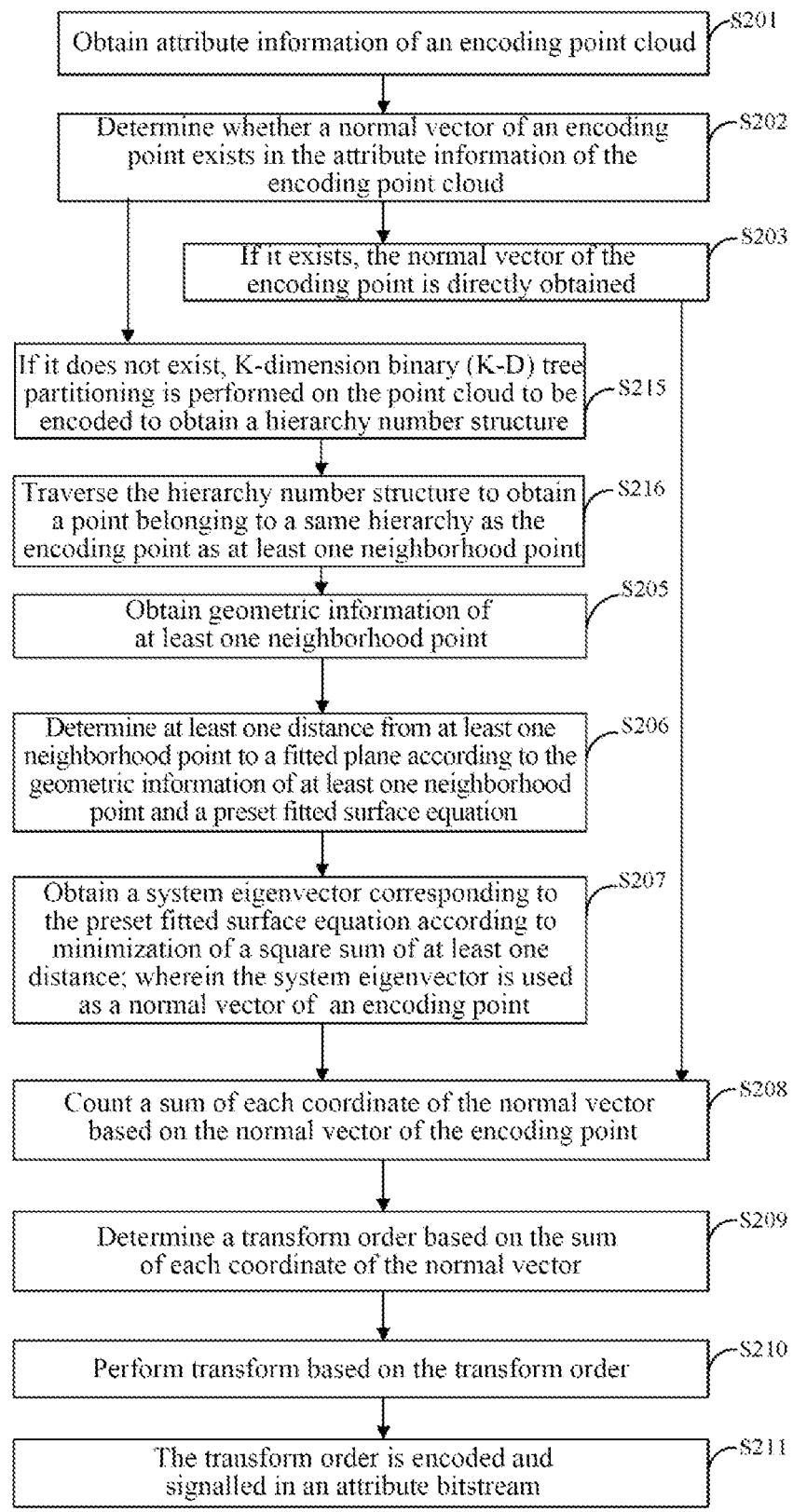
FIG. 13 is a sixth flow chart of a transform method according to an implementation of the present disclosure.

In some implementations of the present disclosure, as shown in FIG. 13, alternative implementation of S204 is S215-S216 as follows.

In S215, if it does not exist, K-dimension binary (K-D) tree partitioning is performed on the encoding point cloud to obtain a hierarchy structure.

In S216, the hierarchy structure is traversed to obtain a point belonging to a same hierarchy as the encoding point as at least one neighborhood point.

In an implementation of the present disclosure, a point cloud that does not contain a normal vector of each point itself is traversed based on a K-dimension binary (K-D) tree, so that it is convenient to search for a neighborhood point.

In an implementation of the present disclosure, an encoder performs K-D tree partitioning on an encoding point cloud to obtain a hierarchy structure. That is to say, the encoder performs K-D tree partitioning on points in a point cloud first, that is, firstly, the points in the point cloud are sorted according to sizes of coordinates along an x direction, and coordinates of a first root node of a middle point are found to partition the point cloud into medians of two parts with a same number of points, and then the point cloud is partitioned along two leaf nodes of different coordinate axes (in an order of x, y, and z) in turn until partitioning is performed on a last layer of which a quantity of points does not exceed P (P is an integer) to obtain a hierarchy structure. The hierarchy structure is traversed to obtain a point belonging to a same hierarchy as the encoding point as at least one neighborhood point, that is, a normal vector is calculated in a unit of subtree.

It may be understood that when K-D partitioning is adopted, each node is an encoding point. Compared with that a parent node of an octree is a combined point, it is more accurate to determine the encoding point directly and then obtain a transform order, which improves a coding accuracy.

Figure 14:
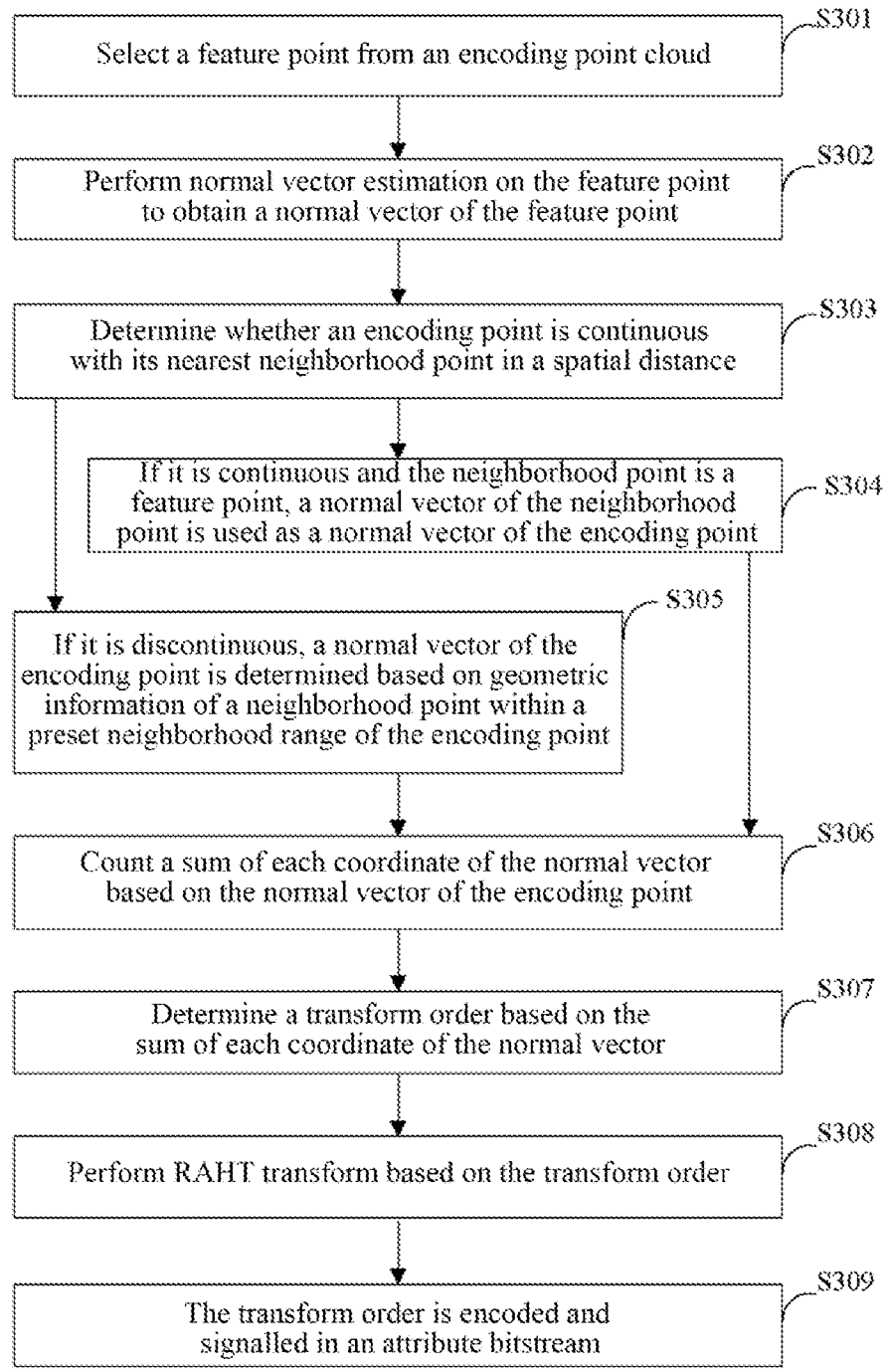
FIG. 14 is a seventh flowchart of a transform method according to an implementation of the present disclosure.

As shown in FIG. 14, an implementation of the present disclosure provides a transform method, which may include following acts S301 to S305.

In S301, a feature point is selected from an encoding point cloud.

In S302, normal vector estimation is performed on the feature point to obtain a normal vector of the feature point.

In S303, it is determined whether an encoding point is continuous with its nearest neighborhood point in a spatial distance.

In S304, if it is continuous and the neighborhood point is a feature point, a normal vector of the neighborhood point is used as a normal vector of the encoding point.

In S305, if it is discontinuous, a normal vector of the encoding point is determined based on geometric information of a neighborhood point within a preset neighborhood range of the encoding point.

In an implementation of the present disclosure, an encoder may also select some points from an encoding point cloud as feature points first, and calculate a normal vector of each feature point through the normal vector estimation method in the foregoing implementation. In this way, when determining a normal vector of another encoding point, the encoder determines whether a nearest neighborhood point in a spatial distance is continuous, if it is continuous, a normal vector of a neighborhood point may be used for representing a current encoding point; if it is discontinuous, then it is represented that there is no neighborhood point that is continuous with a current encoding point, and the normal vector is obtained directly according to the normal vector estimation method of the foregoing implementation. However, if a neighborhood point may be found and is a feature point, then a normal vector of the neighborhood point is known, so the encoder may use the normal vector of the neighborhood point as a normal vector of an encoding point.

It should be noted that an encoder backtracks within a preset neighborhood range according to an order of Morton codes, and determines whether an encoding point is continuous with its nearest neighborhood point in a spatial distance.

It should be noted that the description of implementation of S304-305 here is consistent with the description of implementation of S1013-S1014 in the foregoing implementation, and will not be repeated here.

It may be understood that an encoder may search for a neighborhood of an encoding point which is nearest in space and a neighborhood which is also continuous with respect to a Morton code, which not only ensures proximity on a coding order, but also ensures proximity of actual positions in space, so that the encoding point may be correctly represented by a normal vector of a neighborhood point, which improves estimation accuracy of a normal vector, further improves optimality of a transform order and finally improves a coding performance.

In S306, a sum of each coordinate of the normal vector is counted based on the normal vector of the encoding point.

In S307, a transform order is determined based on the sum of each coordinate of the normal vector.

In S308, RAHT transform is performed based on the transform order.

In S309, the transform order is encoded and signalled in an attribute bitstream.

It should be noted that the description of implementation of S306-309 here is consistent with the description of implementation of S102-S105 in the foregoing implementation, and will not be repeated here.

Figure 15:
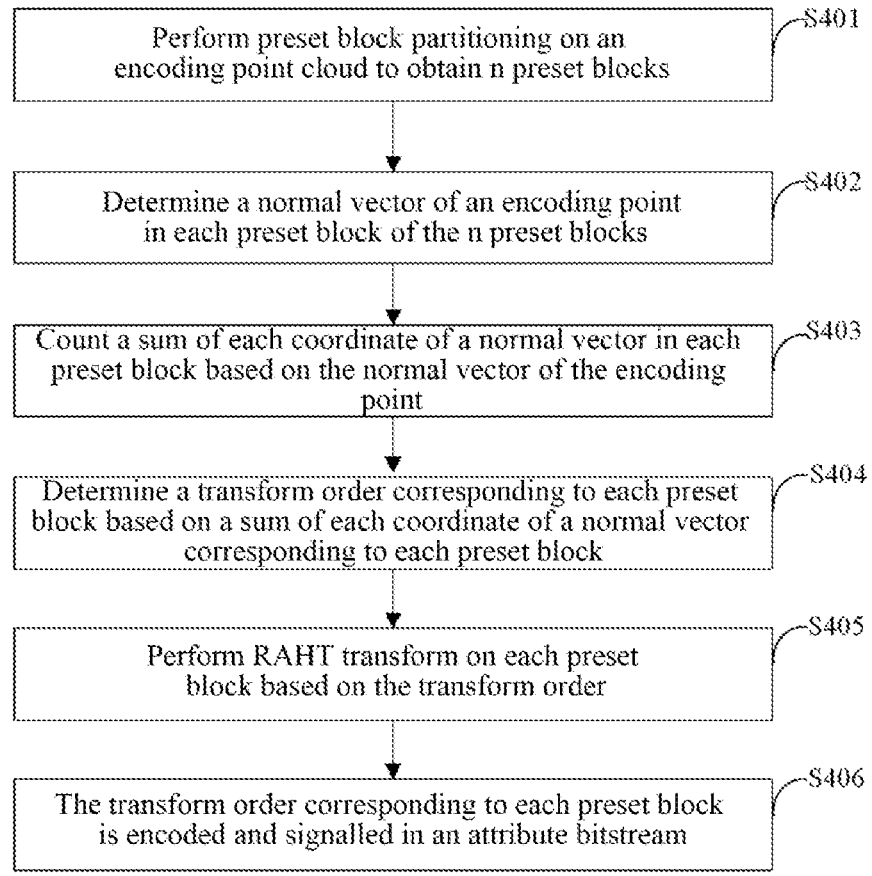
FIG. 15 is an eighth flow chart of a transform method according to an implementation of the present disclosure.

As shown in FIG. 15, an implementation of the present disclosure provides a transform method, which may include following acts S401 to S406.

In S401, preset block partitioning is performed on an encoding point cloud to obtain n preset blocks.

In S402, a normal vector of an encoding point in each preset block of the n preset blocks is determined.

In S403, a sum of each coordinate of a normal vector in each preset block is counted based on the normal vector of the encoding point.

In S404, a transform order corresponding to each preset block is determined based on a sum of each coordinate of a normal vector corresponding to each preset block.

In S405, RAHT transform is performed on each preset block based on the transform order.

In S406, the transform order corresponding to each preset block is encoded and signalled in an attribute bitstream.

In an implementation of the present disclosure, an encoder may perform preset block partitioning to obtain n preset blocks, determine a normal vector of an encoding point in each preset block of the n preset blocks, taking a preset block as a unit, count a sum of each coordinate of a normal vector in each preset block based on the normal vector of the encoding point, and then determine a transform order corresponding to each preset block based on the sum of each coordinate of a normal vector corresponding to each preset block, aiming at each preset block and the transform order corresponding to each preset block itself directly, perform RAHT transform on each preset block respectively, encode the transform order corresponding to each preset block, and then signal the transform order in an attribute bitstream.

It should be noted that during RAHT transform of point cloud attributes, an encoding point cloud may be partitioned, and an order for three directions of RAHT may be determined respectively for different point clouds corresponding to different regions obtained through partitioning. Specific ways of partitioning a region may be different. In this example, a slice partitioning solution is introduced, that is, according to a slice partitioning method of a point cloud in MPEG G-PCC, the point cloud is partitioned into different slices (i.e., preset blocks), and a normal vector estimation method is used for determining an RAHT transform direction order for a point cloud contained in each slice, that is, different RAHT transform orders may be used for different slices.

For example, a preset block may also be a block smaller than a slice and larger than a leaf sub-node of an octree, etc., and this is not limited in an implementation of the present disclosure.

It may be understood that when slice partitioning is adopted, coding may be performed in parallel based on each slice, which also improves fault tolerance and a coding speed.

Figure 16A:
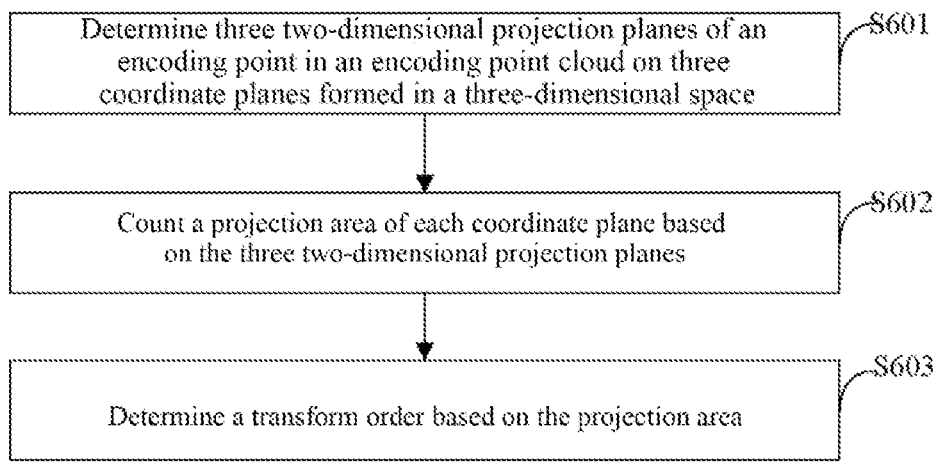
FIG. 16A is a ninth flow chart of a transform method according to an implementation of the present disclosure.

As shown in FIG. 16A, an implementation of the present disclosure provides a transform method, which may include following acts S601 to S603.

In S601, three two-dimensional projection planes of an encoding point in an encoding point cloud on three coordinate planes formed in a three-dimensional space are determined.

In S602, a projection area of each coordinate plane is counted based on the three two-dimensional projection planes.

In S603, a transform order is determined based on the projection area.

Figure 16B:
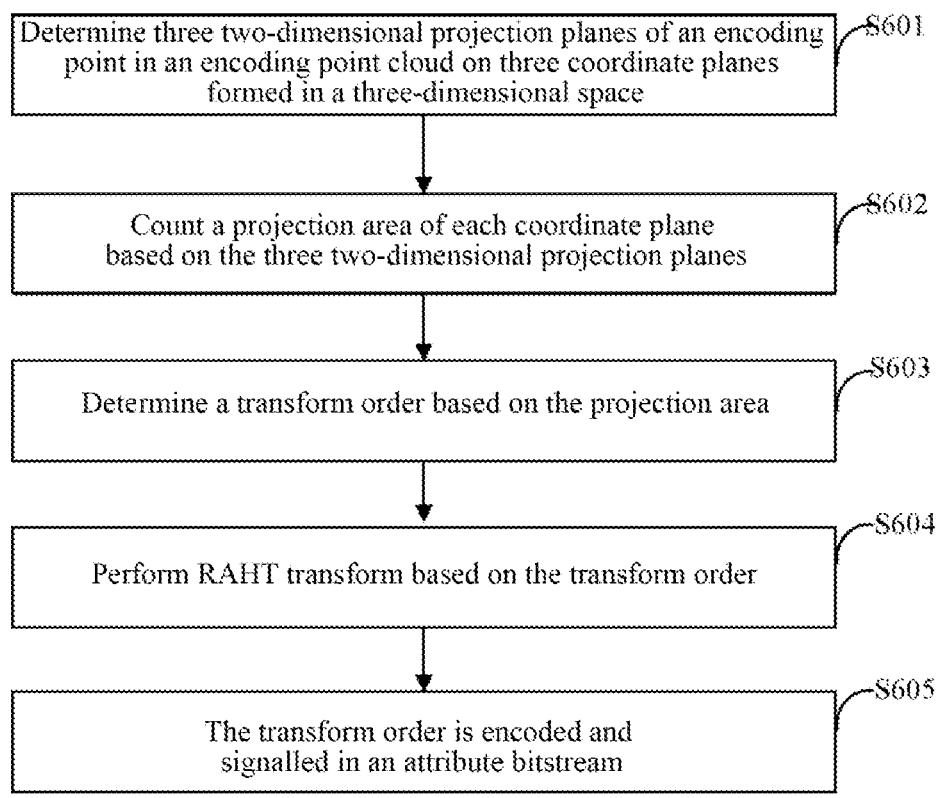
FIG. 16B is a tenth flow chart of a transform method according to an implementation of the present disclosure.

As shown in FIG. 16B, an implementation of the present disclosure provides a transform method, and after the act S603, it further includes acts S604-605 as follows.

In S604, RAHT transform is performed based on the transform order.

In S605, the transform order is encoded and signalled in an attribute bitstream.

In an implementation of the present disclosure, an encoder projects each point (an encoding point) in a three-dimensional point cloud (an encoding point cloud) to three coordinate planes (three planes composed of x, y, and z coordinate axes) in a three-dimensional space, namely an XoY plane, a YoZ plane, and an XoZ plane, and finally obtains three two-dimensional projections of the encoding point, namely three two-dimensional projection planes. The encoder calculates an area of each two-dimensional projection plane, and counts a projection area of each coordinate plane, wherein the projection area represents characteristics of main distribution concentration of the encoding point cloud in the three-dimensional space. A transform order is determined based on the projection area. Since different point clouds have different spatial distributions, before RAHT transform is performed, an encoder may determine a transform order suitable for its own distribution characteristics according to spatial distribution characteristics of each encoding point cloud, so that transform coefficients obtained through RAHT transform performed by the encoder based on the transform order are less redundant, and then a coding efficiency may be improved.

It should be noted that, in an implementation of the present disclosure, that a transform order is determined based on the projection area may be as follows: a quantity of projection points on each projection plane is counted, and a transform order of RAHT is determined based on a principle that the more a quantity of projection planes is, the more prior a transform order is.

It may be understood that since different point clouds have different spatial distributions, before RAHT transform is performed, an encoder may determine a transform order suitable for its own distribution characteristics according to spatial distribution characteristics of each encoding point cloud, so that transform coefficients obtained through RAHT transform performed by the encoder based on the transform order are less redundant, and then a coding efficiency may be improved.

It should be noted that, in an implementation of the present disclosure, since a determined transform order of each encoding point cloud may be different, when the transform order is determined, an encoder needs to signal the transform order in an attribute bitstream in an encoding process. For example, this order may be transmitted to a decoder with a 3-bit bitstream, which is convenient for the decoder to directly parse to obtain a transform order for RAHT during decoding.

In an implementation of the present disclosure, an area of a projection plane may be expressed by a quantity of projection points on each projection plane.

Illustratively, a quantity of projection points on plane XoY is denoted as Num(xoy), a quantity of projection points on plane YoZ is denoted as Num(yoz), and a quantity of projection points on plane ZoX is denoted as Num(zox). A transform order is determined as yxz when a projection area is Num(xoy)>Num(yoz)>Num(zox). A transform order is determined as xyz when a projection area is Num(xoy)>Num(zox)>Num(yoz). A transform order is determined as yzx when a projection area is Num(yoz)>Num(xoy)>Num(zox). A transform order is determined as zyx when a projection area is Num(yoz)>Num(zox)>Num(xoy). A transform order is determined as zxy when a projection area is Num(zox)

>Num(yoz)>Num(xoy). A transform order is determined as xzy when a projection area is Num(zox)>Num(xoy)>Num(yoz).

Figure 17:
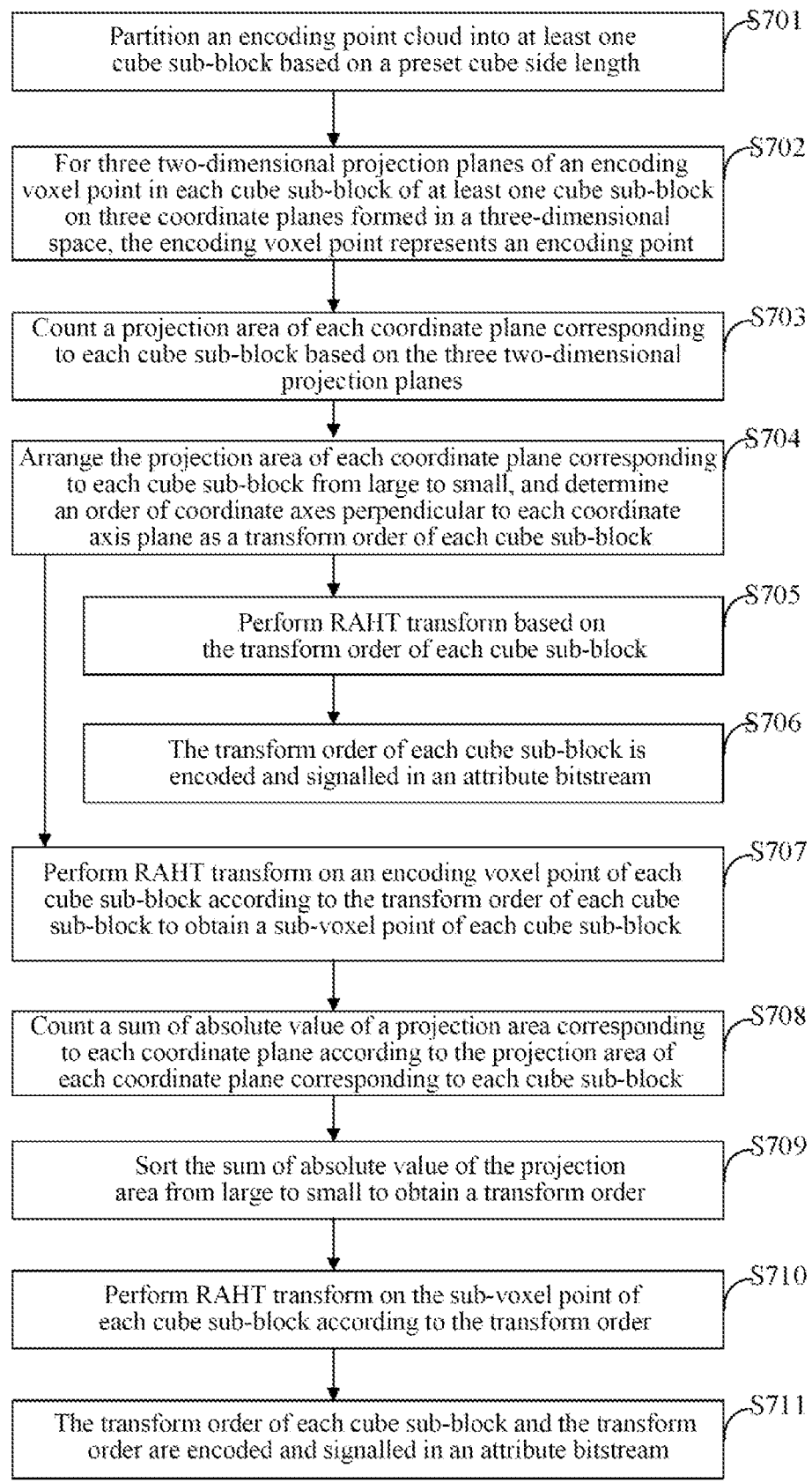
FIG. 17 is an eleventh flow chart of a transform method according to an implementation of the present disclosure.

As shown in FIG. 17, an implementation of the present disclosure provides a transform method, which may include following acts S701 to S706.

In S701, an encoding point cloud is partitioned into at least one cube sub-block based on a preset cube side length.

In S702, three two-dimensional projection planes of an encoding voxel point in each cube sub-block of at least one cube sub-block on three coordinate planes formed in a three-dimensional space are determined, the encoding voxel point represents an encoding point.

In S703, a projection area of each coordinate plane corresponding to each cube sub-block is counted based on the three two-dimensional projection planes.

In S704, the projection area of each coordinate plane corresponding to each cube sub-block is arranged from large to small, and an order of coordinate axes perpendicular to each coordinate axis plane is determined as a transform order of each cube sub-block.

In S705, RAHT transform is performed based on the transform order of each cube sub-block.

In S706, the transform order of each cube sub-block is encoded and signalled in an attribute bitstream.

In an implementation of the present disclosure, an encoder may perform block partitioning on a space where an encoding point cloud is located to obtain n blocks. A transform order for RAHT is determined according to a projection size or projection area of each block on a plane formed by three coordinate axes of x, y, and z pairwise.

Figure 18:
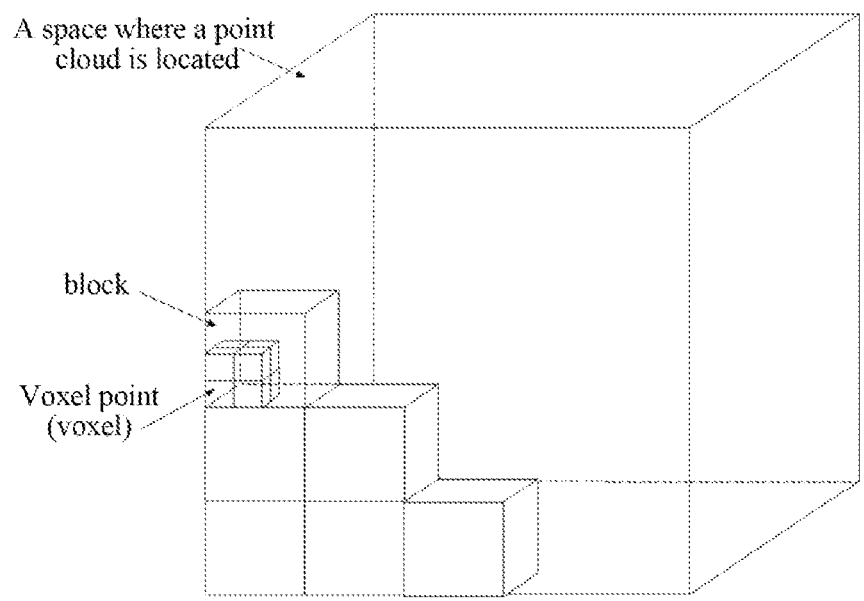
FIG. 18 is a schematic diagram of exemplary spatial partitioning according to an implementation of the present disclosure.

It should be noted that RAHT transform is performed on a basis of a hierarchical structure obtained through octree partitioning performed on point cloud data (an encoding point cloud), starting from a bottom layer of an octree and transforming hierarchically. An implementation process of block partitioning performed by an encoder on a space where an encoding point cloud is located to obtain n blocks is: as shown in FIG. 18, an encoder partitions a point cloud into several N×N×N blocks with a same size by means of an octree, wherein N may be set as a fixed value or set separately according to different point clouds, and this is not limited in an implementation of the present disclosure. That is, each block contains N×N×N voxels, or called voxels. A unit of voxel is 1, which represents an encoding point in an encoding point cloud.

In an implementation of the present disclosure, an encoder determines three two-dimensional projection planes of an encoding voxel point in each cube sub-block of at least one cube sub-block on three coordinate planes formed in a three-dimensional space, the encoding voxel point represents an encoding point, the encoder counts a projection area of each coordinate plane corresponding to each cube sub-block based on the three two-dimensional projection planes; then the projection area of each coordinate plane corresponding to each cube sub-block is arranged from large to small, an order of coordinate axes perpendicular to each coordinate axis plane is determined as a transform order of each cube sub-block. RAHT transform is performed based on the transform order of each cube sub-block; and the transform order corresponding to each cube sub-block is encoded and signalled in an attribute bitstream.

Illustratively, in each block, an encoder calculates its projection areas on XoY, XoZ, and YoZ planes, counts total numbers of projections in three projection planes, considers the total numbers of projections as projection areas, sorts the projection areas from large to small, and then takes an order of coordinate axis directions perpendicular to the projection planes as an order of RAHT transform in the block. For example, an XoY projection area is larger than an XoZ projection area, the XoZ projection area is larger than a YoZ projection area, the projection areas are sorted as: XoY, XoZ, and YoZ, then a coordinate axis direction perpendicular to an XoY projection plane is z, a coordinate axis direction perpendicular to an XoZ projection plane is y, and a coordinate axis direction perpendicular to a YoZ projection plane is x, so a transform order is determined as zyx based on an order of XoY, XoZ, and YoZ.

It should be noted that during RAHT transform of point cloud attributes, an encoding point cloud may be partitioned, and an order for three directions of RAHT may be determined respectively for different point clouds corresponding to different regions obtained through partitioning. Specific partitioning methods may be different. In this example, a block partitioning solution is introduced, that is, according to a block partitioning method of a point cloud in MPEG G-PCC, the point cloud is partitioned into blocks, and a projection area statistics method is used for determining an RAHT transform order for a point cloud contained in each block, that is, different RAHT transform orders may be used for different blocks.

For example, a size of partitioning may also be a slice, etc., which is not limited in an implementation of the present disclosure.

In S707, RAHT transform is performed on an encoding voxel point of each cube sub-block according to the transform order of each cube sub-block to obtain a sub-voxel point of each cube sub-block.

In S708, a sum of absolute value of a projection area corresponding to each coordinate plane is counted according to the projection area of each coordinate plane corresponding to each cube sub-block.

In S709, the sum of absolute value of the projection area is sorted from large to small to obtain a transform order.

In S710, RAHT transform is performed on the sub-voxel point of each cube sub-block according to the transform order.

In S711, the transform order of each cube sub-block is signalled in an attribute bitstream.

In an implementation of the present disclosure, after an encoder determines a transform order of each cube sub-block, the encoder may perform RAHT transform on an encoding voxel point of each cube sub-block according to a transform order of each cube sub-block to obtain a sub-voxel point of each cube sub-block, count a sum of an absolute value of a projection area corresponding to each coordinate plane according to a projection area of each coordinate plane corresponding to each cube sub-block, sort the sum of the absolute value of the projection area from large to small to obtain a transform order, and finally perform RAHT transform on the sub-voxel point of each cube sub-block according to the transform order.

That is to say, after obtaining a transform order of each block, an encoder performs RAHT transform inside the block based on this transform order to obtain sub-voxel points of each cube sub-block. After the RAHT transform in the block is completed, projection areas in all directions in all blocks are summed and sorted from large to small to obtain an overall RAHT transform order. RAHT transform is performed between sub-voxel points of each cube sub-block based on the overall RAHT transform order, and finally a transform order of each cube sub-block needs to be signalled in an attribute bitstream, which is convenient for a decoder to use when decoding.

It may be understood that projection areas of various coordinates are counted according to a projection area of an encoding point, and finally a transform order of RAHT transform is determined based on an order of sizes of projection areas of various coordinates. In this way, considering accumulation of projection areas, that is, spatial distribution characteristics, transform in a direction with a significant feature is prioritized, thus achieving purposes of reducing redundancy of transform coefficients obtained through transform and improving an encoding and decoding efficiency.

Figure 19:
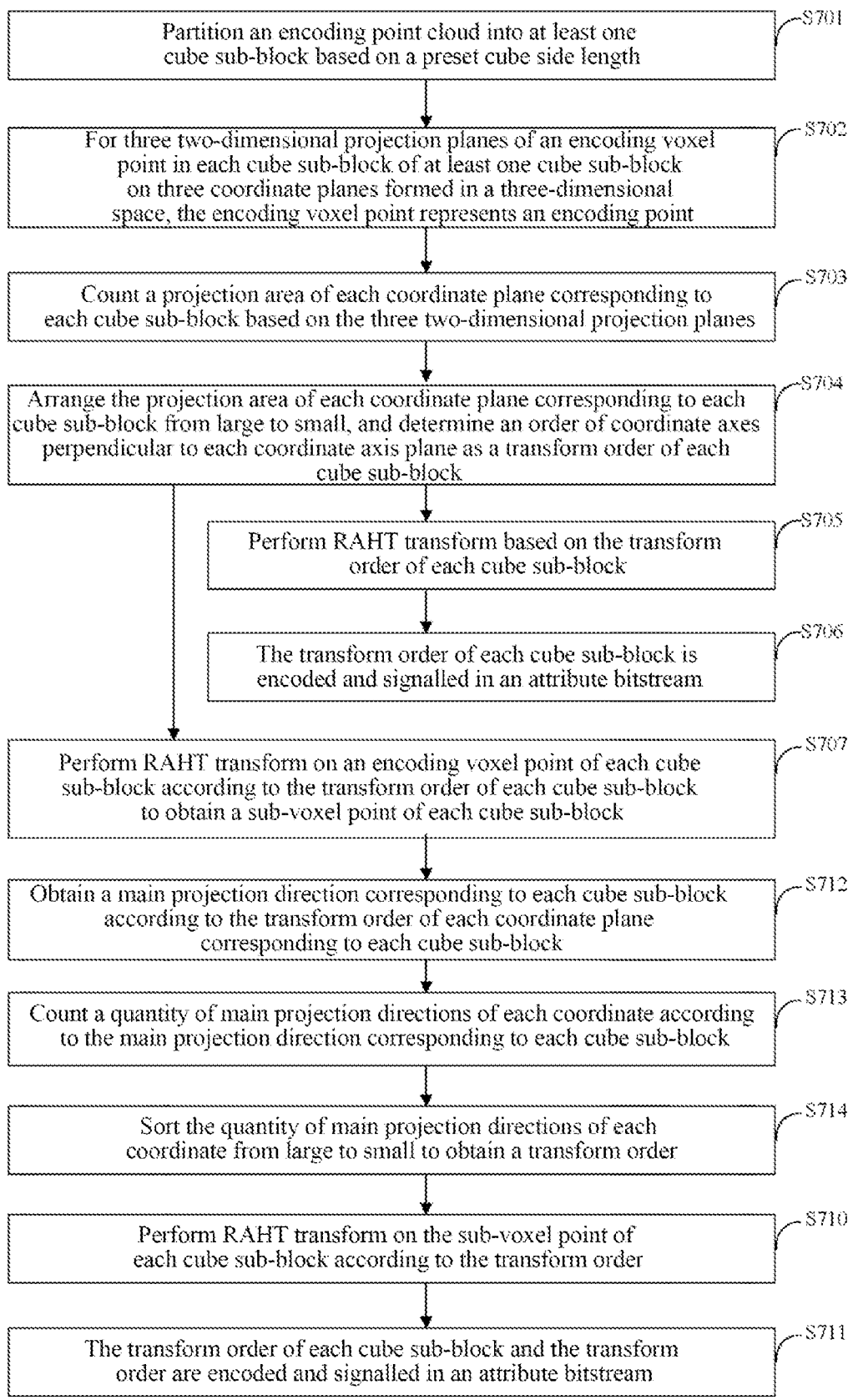
FIG. 19 is a twelfth flow chart of a transform method according to an implementation of the present disclosure.

In some implementations of the present disclosure, as shown in FIG. 19, after the act S707 and before the act S710, the method further includes following acts.

In S712, a main projection direction corresponding to each cube sub-block is obtained according to the transform order corresponding to each cube sub-block.

In S713, a quantity of main projection directions of each coordinate is counted according to the main projection direction corresponding to each cube sub-block.

In S714, the quantity of main projection directions of each coordinate is sorted from large to small to obtain a transform order.

In an implementation of the present disclosure, a method by which an encoder determines a transform order of each block may also be: after RAHT transform is performed on an encoding voxel point of each cube sub-block according to a transform order of each cube sub-block to obtain a sub-voxel point of each cube sub-block, a main projection direction in the transform order of each cube sub-block is obtained, and quantities of main projection directions of various coordinates are counted based on the main projection direction of each cube sub-block, the quantities of main projection directions of various coordinates are sorted from large to small to obtain a transform order, and RAHT transform may be performed on a whole encoding point cloud based on the transform order.

It should be noted that in an implementation of the present disclosure, a main projection direction corresponding to each cube sub-block is a first coordinate direction in a transform order corresponding to each cube sub-block.

Illustratively, it is assumed that an encoder partitions an encoding point cloud into three blocks. Wherein a transform order of block 1 is xyz, a transform order of block 2 is zyx, and a transform order of block 3 is zxy, then the encoder obtains that a main projection direction of block 1 is x, a main projection direction of block 2 is z, and a main projection direction of block 3 is z. After obtaining the three main projection directions, according to a main projection direction corresponding to each cube sub-block, a quantity of main projection directions of x quantity is 1, a quantity of main projection directions of y quantity is 0, and a quantity of main projection directions of z quantity is 2. Since 2>1>0, quantities of main projection directions of various coordinates are sorted from large to small to obtain a transform order of zxy.

Figure 20:
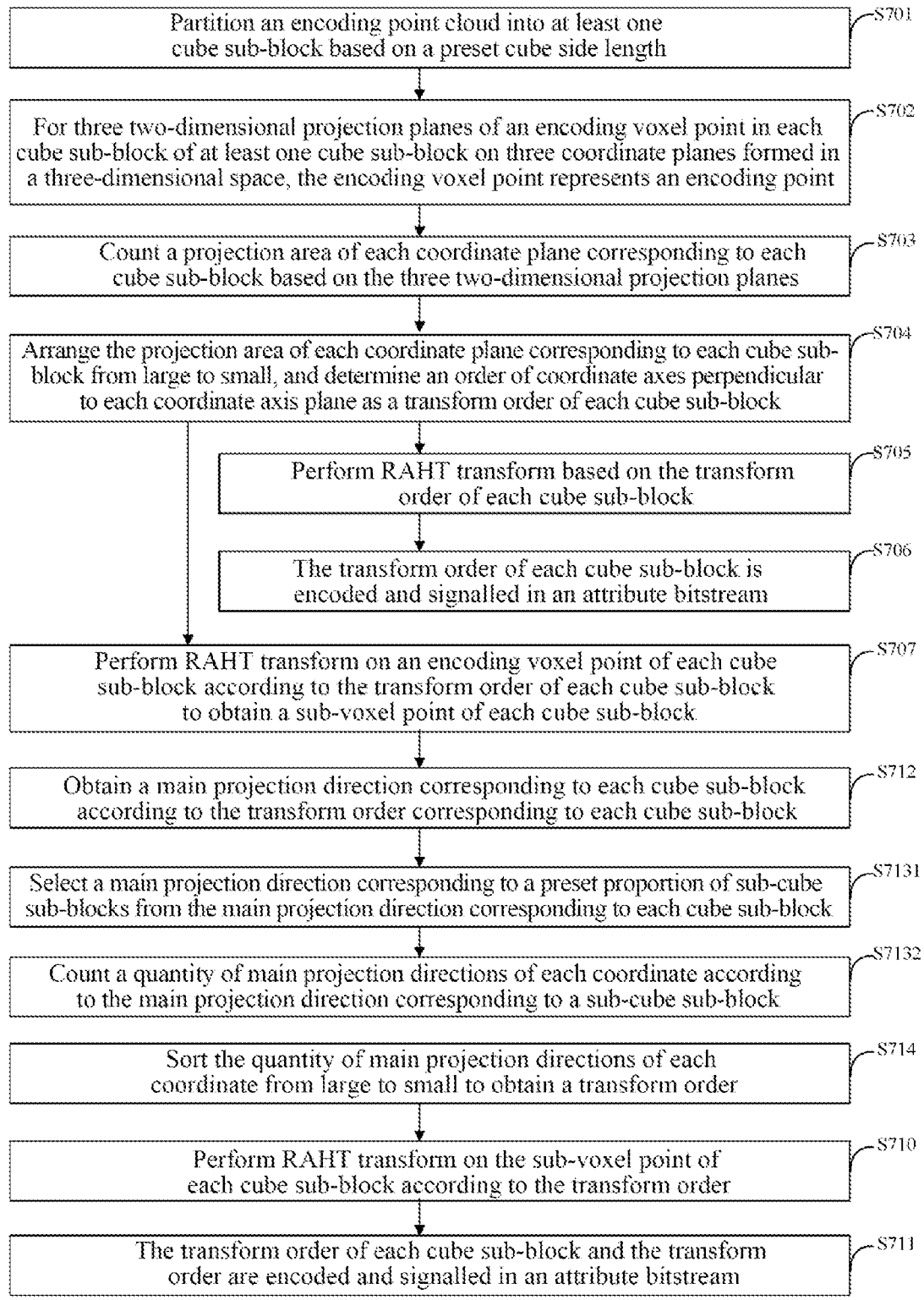
FIG. 20 is a thirteenth flow chart of a transform method according to an implementation of the present disclosure.

As shown in FIG. 20, an implementation process of the act S713 may include acts S7131-S7132, including following acts.

In S7131, a main projection direction corresponding to a preset proportion of sub-cube sub-blocks is selected from the main projection direction corresponding to each cube sub-block.

In S7132, a quantity of main projection directions of each coordinate is counted according to the main projection direction corresponding to a sub-cube sub-block.

In an implementation of the present disclosure, an encoder partitions a space where an encoding point cloud is located into N blocks, and a preset proportion of sub-cube blocks may be selected from the N blocks, and a quantity of main projection directions of each coordinate is counted by using main projection directions corresponding to the sub-cube sub-blocks, thereby obtaining a transform order.

Among them, the preset proportion may be 10%, which is determined based on an actual demand and design, and this is not limited in an implementation of the present disclosure.

Illustratively, an encoder partitions a space where an encoding point cloud is located into 100 blocks with 100 main projection directions. When a preset proportion is 10%, the encoder may select 10 blocks from 100 blocks, and through three-dimensional main projection directions of the 10 blocks, count quantities of main projection directions of each coordinate.

It may be understood that partial blocks are used for statistics, which improves a processing speed and reduces a calculation amount.

Figure 21:
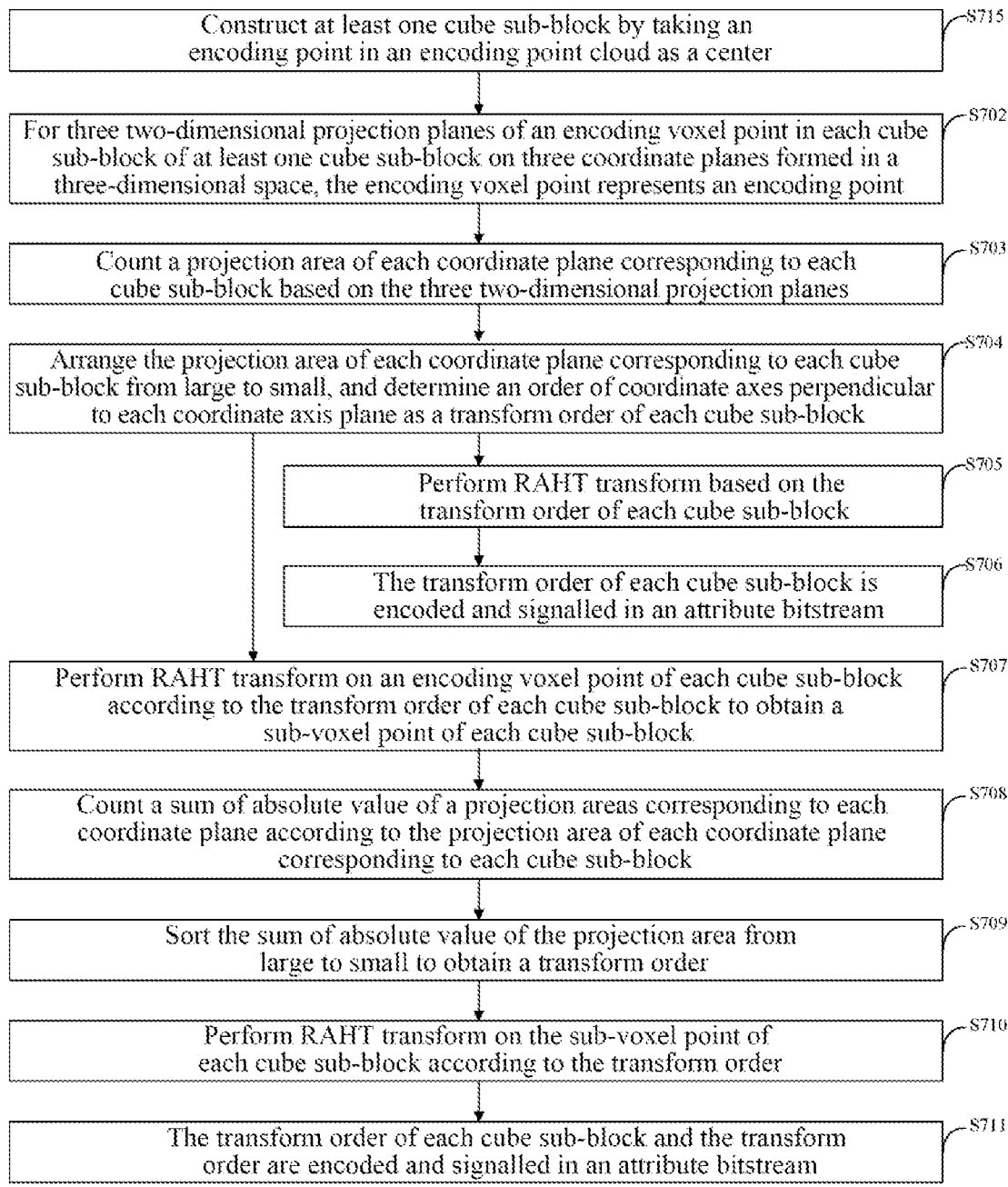
FIG. 21 is a fourteenth flow chart of a transform method according to an implementation of the present disclosure.

As shown in FIG. 21, in some implementations of the present disclosure, before the act S702, the method further includes act S715 as follows.

In S715, at least one cube sub-block is constructed by taking an encoding point in an encoding point cloud as a center.

In an implementation of the present disclosure, a method that an encoder partitions a space where an encoding point cloud is located into blocks may also be: each encoding point is used as a center or a central axis, and a cube sub-block with a length of N×N×N voxels is constructed with each encoding point as a voxel center.

A difference between this method and direct block partitioning is that voxel blocks in each block are partitioned with the block as a center, and distribution of points in each voxel is determined by which voxel a point falls into. While herein, partition for each voxel in a cube sub-block is performed by unit 1 with each encoding point as a center, and there may be an overlap between voxels.

In an implementation of the present disclosure, adoption of a determination method to determine a better RAHT transform order may bring performance gains to point cloud reconstruction. As shown in Table 1 below, a Peak Signal/Noise Ratio (PSNR) of point cloud reconstruction is reduced, and a Bjontegaard Delta rate (BD-rate) is also obviously improved. (A PSNR is an objective criteria for picture evaluation. The larger the PSNR is, the better the picture quality is. A BD-rate is a parameter used for measuring performance. When a BD-rate is negative, it means that performance becomes better. On this basis, the greater the absolute value of BD-rate is, the greater the performance gain is.)

TABLE 1

| Point cloud data | Transform order | PSNR mode | | | BD rate | | |
|---|---|---|---|---|---|---|---|
| | | Y | U | V | Y | U | V |
| Egyptian_mask_vox12 | yxz | 0.13149775 | 0.067567869 | 0.064877291 | −3.133938 | −2.575281 | −3.003749 |
| Shiva_00035_vox12 | zyx | −0.00733623 | 0.006896078 | 0.005066235 | 0.09546 | −0.190368 | −0.017342 |
| Shiva_00035_vox20 | zyx | 0.032890806 | 0.019674723 | 0.01473075 | −0.379846 | −0.59011 | −0.435615 |
| Soldier_vox10_0690 standing soldiers | yxz | 0.115455448 | 0.08809567 | 0.060283129 | −2.34877 | −3.82889 | −2.7174 |
| Average (average gain) | | 0.065402 | 0.043736 | 0.03479 | −1.3841 | −1.72432 | −1.48179 |

As may be seen from Table 1, RAHT transform is performed for four point clouds with different transform orders, and Average gains obtained are all remarkable, which greatly improves performance of an encoder.

It may be understood that by using this implementation solution, since each voxel is centered on an encoding point, a projection area of a voxel obtained in this way is used as a projection area of the encoding point, which will be more accurate.

Based on background of the foregoing introduction, the following describes a transform method according to an implementation of the present disclosure, which is mainly applied to a decoder (a point cloud decoder) in view of a process of obtaining a transform order during inverse RAHT transform in a decoder framework.

Figure 22:
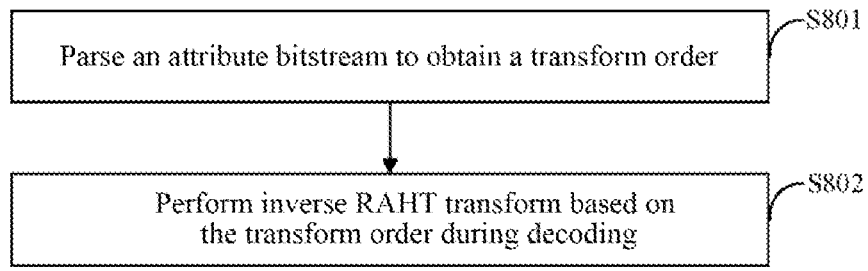
FIG. 22 is a flow chart of an inverse transform method according to an implementation of the present disclosure.

As shown in FIG. 22, an implementation of the present disclosure provides an inverse transform method, which is applied to a decoder and includes following acts S801 to S802.

In S801, an attribute bitstream is parsed to obtain a transform order.

In S802, inverse RAHT transform is performed based on the transform order during decoding.

In an implementation of the present disclosure, when an encoded bitstream is transmitted to a decoder, the decoder may parse an attribute bitstream in the encoded bitstream to obtain a transform order, and then the transform order may be used when the decoder performs inverse RAHT transform.

It may be understood that an encoder uses spatial distribution characteristics of an encoding point cloud to obtain an optimal transform order of RAHT transform corresponding to each encoding point cloud. In this way, considering accumulation of normal vectors, transform in a direction with significant features is prioritized, thus achieving purposes of reducing redundancy of transform coefficients obtained through transform and improving an encoding and decoding efficiency. Since a transform order corresponding to each encoding point cloud may be different, a transform order needs to be encoded and signalled in an attribute bitstream during encoding, which is convenient for a decoder to use when performing inverse RAHT transform during decoding.

Figure 23:
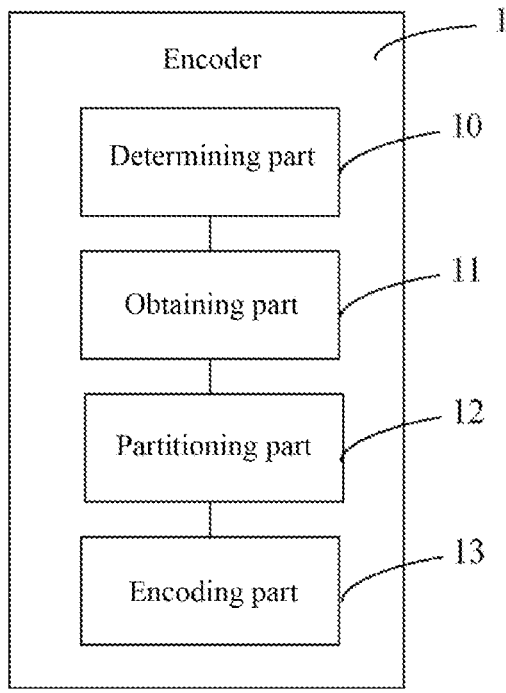
FIG. 23 is a first schematic diagram of a structure of an encoder according to an implementation of the present disclosure.

Based on an implementation basis of the foregoing implementations, as shown in FIG. 23, an implementation of the present disclosure provides an encoder 1, which includes: a determining part 10 configured to determine a normal vector of an encoding point in an encoding point cloud; and an obtaining part 11 configured to count a sum of each coordinate of the normal vector based on the normal vector of the encoding point; the determining part 10 is further configured to determine a transform order based on the sum of each coordinate of the normal vector.

In some implementations of the present disclosure, the encoder further includes a transform part and an encoding part.

The transform part 12 is configured to perform RAHT transform based on the transform order.

The encoding part 13 is configured to encode the transform order and signal the transform order in an attribute bitstream.

In some implementations of the present disclosure, the encoder further includes a judging part 14.

The obtaining part 11 is further configured to obtain attribute information of the encoding point cloud.

The judging part 14 is further configured to determine whether a normal vector of an encoding point exists in the attribute information of the encoding point cloud.

The obtaining part 11 is further configured to directly obtain the normal vector of the encoding point if the normal vector of the encoding point exists.

The determining part 10 is further configured to determine a normal vector of an encoding point based on attribute information of a neighborhood point within a preset neighborhood range of the encoding point if the normal vector of the encoding point does not exist.

In some implementations of the present disclosure, the obtaining part 11 is further configured to obtain at least one neighborhood point nearest to the encoding point within the preset neighborhood range; and obtain geometric information of the at least one neighborhood point.

The determining part 10 is further configured to determine at least one distance from the at least one neighborhood point to a fitted plane according to the geometric information of the at least one neighborhood point and a preset fitted surface equation.

The obtaining part 11 is further configured to obtain a system eigenvector corresponding to the preset fitted surface equation according to minimization of a square sum of the at least one distance; wherein the system eigenvector is used as the normal vector of the encoding point.

In some implementations of the present disclosure, the preset fitted surface equation includes: a plane equation that does not cross an origin and a plane equation that crosses the origin.

In some implementations of the present disclosure, the obtaining part 11 is further configured to traverse the encoding point cloud in an order of Morton codes, and select the at least one neighborhood point nearest to the encoding point within the preset neighborhood range.

In some implementations of the present disclosure, the obtaining part 11 is further configured to traverse the encoding point cloud according to a spatial distance, and select the at least one neighborhood point nearest to the encoding point within the preset neighborhood range.

In some implementations of the present disclosure, the obtaining part 11 is further configured to obtain a normal vector of at least one neighborhood point after obtaining the at least one neighborhood point nearest to the encoding point within the preset neighborhood range; and perform normal vector estimation on the feature point to obtain a normal vector of the feature point.

In some implementations of the present disclosure, the encoder further includes a judging part 14.

The determining part 10 is further configured to select a feature point from the encoding point cloud, and perform normal vector estimation on the feature point to obtain a normal vector of the feature point.

The judging part 14 is configured to determine whether the encoding point is continuous with its nearest neighborhood point in a spatial distance.

The determining part 10 is further configured to use a normal vector of a neighborhood point as a normal vector of the encoding point if the encoding point is continuous with its nearest neighborhood point in a spatial distance and the neighborhood point is the feature point; and determine a normal vector of the encoding point based on geometric information of a neighborhood point within a preset neighborhood range of the encoding point if the encoding point is not continuous with its nearest neighborhood point in a spatial distance.

In some implementations of the present disclosure, the judging part 14 is further configured to backtrack within a preset neighborhood according to an order of Morton codes, and determine whether the encoding point is continuous with its nearest neighborhood in a spatial distance.

In some implementations of the present disclosure, the obtaining part 11 is further configured to perform preset block partitioning on the encoding point cloud to obtain n preset blocks.

The determining part 10 is further configured to determine a normal vector of an encoding point in each preset block of the n preset blocks.

The obtaining part 11 is further configured to count a sum of each coordinate of the normal vector in each preset block based on the normal vector of the encoding point.

In some implementations of the present disclosure, the determining part 10 is further configured to determine a transform order corresponding to each preset block based on the sum of each coordinate of the normal vector corresponding to each preset block.

In some implementations of the present disclosure, the obtaining part 11 is further configured to count a sum of an absolute value of each coordinate of a normal vector based on the normal vector of the encoding point; wherein the sum of absolute value represents a sum of each coordinate of the normal vector.

In some implementations of the present disclosure, the determining part 10 is further configured to arrange the sum of the absolute value in an order from large to small, and determine a transform order.

An implementation of the present disclosure further provides an encoder, including: a determining part 10 configured to determine three two-dimensional projection planes of an encoding point in an encoding point cloud on three coordinate planes formed in a three-dimensional space; and an obtaining part 11 configured to count a projection area of each coordinate plane based on the three two-dimensional projection planes; the determining part 10 is further configured to determine a transform order based on the projection area.

In some implementations of the present disclosure, the encoder further includes a transform part and an encoding part.

The transform part 12 is configured to perform RAHT transform based on the transform order.

The encoding part 13 is configured to encode the transform order and signal the transform order in an attribute bitstream.

In some implementations of the present disclosure, the obtaining part 11 is further configured to partition the encoding point cloud into at least one cube sub-block based on a preset cube side length, determine three two-dimensional projection planes of an encoding voxel point in each cube sub-block of the at least one cube sub-block on three coordinate planes formed in a three-dimensional space, the encoding voxel point represents the encoding point; and count a projection area of each coordinate plane corresponding to each cube sub-block based on the three two-dimensional projection planes.

In some implementations of the present disclosure, the determining part 10 is further configured to arrange the projection area of each coordinate plane corresponding to each cube sub-block from large to small, and determine an order of coordinate axes perpendicular to each coordinate axis plane as a transform order of each cube sub-block.

In some implementations of the present disclosure, the transform part 12 is further configured to perform RAHT transform on the encoding voxel point of each cube sub-block according to the transform order of each cube sub-block to obtain a sub-voxel point of each cube sub-block after the projection area of each coordinate plane corresponding to each cube sub-block is arranged from large to small, and the order of coordinate axes perpendicular to each coordinate axis plane is determined as the transform order of each cube sub-block.

The obtaining part 11 is further configured to count a sum of an absolute value of a projection area corresponding to each coordinate plane according to the projection area of each coordinate plane corresponding to each cube sub-block; sort the sum of the absolute value of the projection area from large to small to obtain the transform order.

The transform part 12 is further configured to perform RAHT transform on the sub-voxel point of each cube sub-block according to the transform order.

The encoding part 13 is further configured to signal a transform order of each cube sub-block in an attribute bitstream.

In some implementations of the present disclosure, the obtaining part 11 is further configured to, after performing RAHT transform on the encoding voxel point of each cube sub-block according to the transform order of each cube sub-block to obtain the sub-voxel point of each cube sub-block and before performing RAHT transform on the sub-voxel point of each cube sub-block according to the transform order, obtain a main projection direction corresponding to each cube sub-block according to the transform order corresponding to each cube sub-block; count a quantity of main projection directions of each coordinate according to the main projection direction corresponding to each cube sub-block; and sort the quantity of the main projection directions of each coordinate from large to small to obtain the transform order.

In some implementations of the present disclosure, the obtaining part 11 is further configured to select main projection directions corresponding to a preset proportion of sub-cube sub-blocks from the main projection direction corresponding to each cube sub-block; and count a quantity of main projection directions of each coordinate according to the main projection directions corresponding to the sub-cube sub-blocks.

In some implementations of the present disclosure, the obtaining part 11 is further configured to construct the at least one cube sub-block with the encoding point in the encoding point cloud being a center before determining three two-dimensional projection planes of the encoding voxel point in each cube sub-block of the at least one cube sub-block on three coordinate planes formed in the three-dimensional space.

In some implementations of the present disclosure, the determining part 10 is further configured to determine a transform order as yxz when a projection area is Num(xoy)>Num(yoz)>Num(zox), determine a transform order as xyz when a projection area is Num(xoy)>Num(zox)>Num(yoz), determine a transform order as yzx when a projection area is Num(yoz)>Num(xoy)>Num(zox), determine a transform order as zyx when a projection area is Num(yoz)>Num(zox)>Num(xoy), determine a transform order as zxy when a projection area is Num(zox)>Num(yoz)>Num(xoy), and determine a transform order as xzy when a projection area is Num(zox)>Num(xoy)>Num(yoz).

Figure 24:
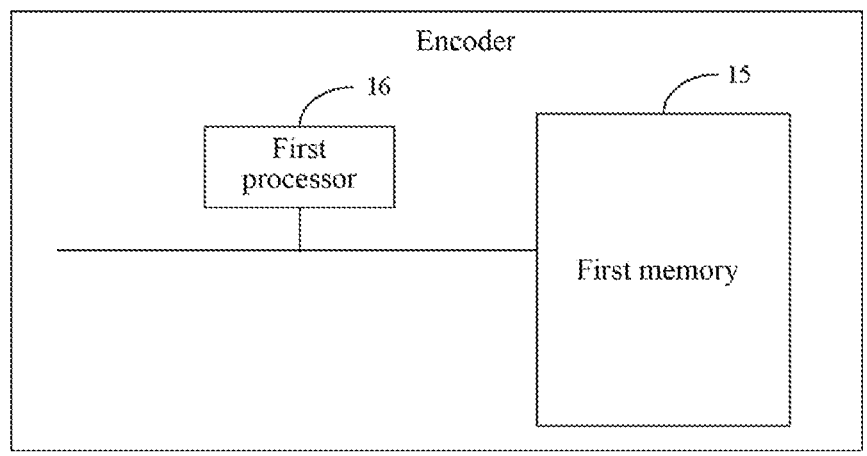
FIG. 24 is a second schematic diagram of a structure of an encoder according to an implementation of the present disclosure.

In practical application, as shown in FIG. 24, an implementation of the present disclosure further provides an encoder, including: a first memory 15 configured to store executable instructions; and a first processor 16 configured to implement a transform method on an encoder side when executing the executable instructions stored in the first memory 15.

The processor may be achieved by software, hardware, firmware, or their combination, and may use circuits, single or multiple application specific integrated circuits (ASIC), single or multiple general integrated circuits, single or multiple microprocessors, single or multiple programmable logic devices, or the combination of the aforementioned circuits or devices, or other suitable circuits or devices, so that the processor may implement corresponding acts of the transform method in the aforementioned implementations.

An implementation of the present disclosure provides a computer-readable storage medium including executable instructions stored thereon, wherein a transform method on an encoder side is implemented when the executable instructions are executed by a first processor.

Various components in the implementations of the present disclosure may be integrated into one processing unit, or various units may exist physically separately, or two or more than two units may be integrated into one unit. The integrated units may be implemented in a form of hardware, or may be implemented in a form of a software functional module.

The integrated units, if implemented in a form of a software functional module and not sold or used as an independent product, may be stored in a computer-readable storage medium. Based on such understanding, the technical solutions of the implementations, in essence, or part contributing to the prior art, or all or part of the technical solutions, may be embodied in a form of a software product, the computer software product is stored in a storage medium, and includes several instructions for enabling a computer device (which may be a personal computer, a server, or a network device, etc.) or a processor to perform all or part of acts of the methods of the implementations. The aforementioned storage medium includes various media that may store program codes, such as a ferromagnetic random access memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, or a Compact Disc Read-Only Memory (CD-ROM), which are not limited in the implementations of the present disclosure.

Figure 25:
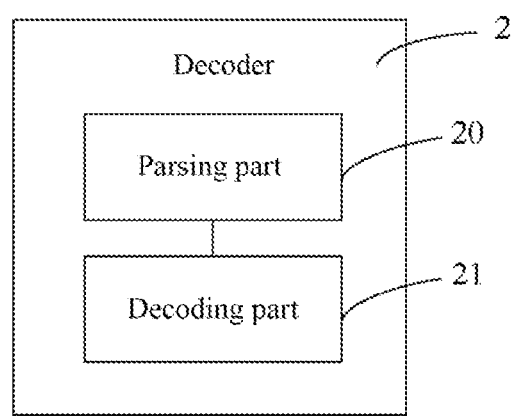
FIG. 25 is a first schematic diagram of a structure of a decoder according to an implementation of the present disclosure.

As shown in FIG. 25, an implementation of the present disclosure further provides a decoder, including: a parsing part 20 configured to parse an attribute bitstream to obtain a transform order; and a decoding part 21 configured to perform inverse RAHT transform based on the transform order during decoding.

Figure 26:
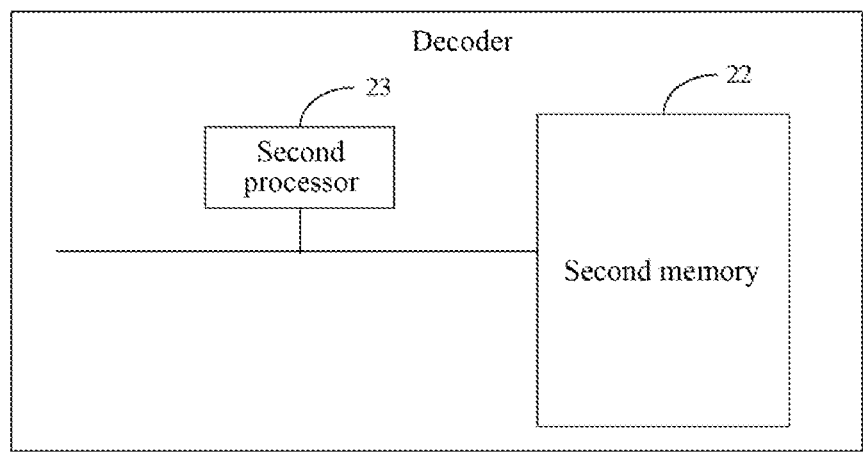
FIG. 26 is a second schematic diagram of a structure of a decoder according to an implementation of the present disclosure.

In practical application, as shown in FIG. 26, an implementation of the present disclosure further provides a decoder, including: a second memory 22 configured to store executable instructions; and a second processor 23 configured to implement a transform method on a decoder side when executing the executable instructions stored in the second memory 22.

An implementation of the present disclosure provides a computer-readable storage medium including executable instructions stored thereon, wherein a transform method on a decoder side is implemented when the executable instructions are executed by a second processor.

It may be understood that since in a process of attribute encoding, aiming at realization of RAHT transform, an encoder counts a sum of each coordinate of a normal vector through the normal vector of an encoding point, then finally a transform order of RAHT transform is determined based on the sum of each coordinate of the normal vector. In this way, considering accumulation of normal vectors, transform in a direction with a significant feature is prioritized, thus achieving purposes of reducing redundancy of transform coefficients obtained through transform and improving an encoding and decoding efficiency.

INDUSTRIAL APPLICABILITY

The implementations of the present disclosure provide a transform method, an encoder, a decoder, and a computer-readable storage medium, including: a normal vector of an encoding point in an encoding point cloud is determined; a sum of each coordinate of the normal vector is counted based on the normal vector of the encoding point; a transform order is determined based on the sum of each coordinate of the normal vector; RAHT transform is performed based on the transform order; and the transform order is encoded and signalled in an attribute bitstream. In a process of attribute encoding, aiming at realization of RAHT transform, an encoder counts a sum of each coordinate of a normal vector through the normal vector of an encoding point, then finally a transform order of RAHT transform is determined based on the sum of each coordinate of the normal vector. In this way, considering accumulation of normal vectors, transform in a direction with a significant feature is prioritized, thus achieving purposes of reducing redundancy of transform coefficients obtained through transform and improving an encoding and decoding efficiency.

The invention claimed is:
1. A transform method, applied to an encoder, comprising:
   determining a normal vector of an encoding point in an encoding point cloud;

counting a sum of each coordinate of the normal vector based on the normal vector of the encoding point; and determining a transform order based on the sum of each coordinates of the normal vector.

2. The method of claim 1, wherein after determining the transform order based on the sum of the normal vector, the method further comprises:

performing Region Adaptive Hierarchical Transform (RAHT) transform based on the transform order; and encoding the transform order and signalling the transform order in an attribute bitstream, wherein the transform order is an order of coordinate axes.

3. The method of claim 1, wherein determining the normal vector of the encoding point in the encoding point cloud comprises:

obtaining attribute information of the encoding point cloud;

determining whether a normal vector of an encoding point exists in the attribute information of the encoding point cloud;

obtaining the normal vector of the encoding point directly if the normal vector of the encoding point exists;

determining a normal vector of the encoding point based on geometric information of a neighborhood point within a preset neighborhood range of the encoding point if the normal vector of the encoding point does not exist.

4. The method of claim 3, wherein determining the normal vector of the encoding point based on the geometric information of the neighborhood point within the preset neighborhood range of the encoding point comprises:

obtaining at least one neighborhood point nearest to the encoding point within the preset neighborhood range;

obtaining geometric information of the at least one neighborhood point;

determining at least one distance from the at least one neighborhood point to a fitted plane according to the geometric information of the at least one neighborhood point and a preset fitted surface equation; and obtaining a system eigenvector corresponding to the preset fitted surface equation according to minimization of a square sum of the at least one distance, wherein the system eigenvector is used as the normal vector of the encoding point.

5. The method of claim 4, wherein, the preset fitted surface equation comprises: a plane equation that does not cross an origin and a plane equation that crosses the origin.

6. The method of claim 4, wherein obtaining the at least one neighborhood point nearest to the encoding point within the preset neighborhood range comprises:

traversing the encoding point cloud in an order of Morton codes, and selecting the at least one neighborhood point nearest to the encoding point within the preset neighborhood range.

7. The method of claim 4, wherein obtaining the at least one neighborhood point nearest to the encoding point within the preset neighborhood range comprises:

traversing the encoding point cloud according to a spatial distance, and selecting the at least one neighborhood point nearest to the encoding point within the preset neighborhood range.

8. The method of claim 4, wherein obtaining the at least one neighborhood point nearest to the encoding point within the preset neighborhood range comprises:

performing K-dimension binary tree (K-D) partitioning on the encoding point cloud to obtain a hierarchy number structure; and traversing the hierarchy number structure, and obtaining a point belonging to a same hierarchy as the encoding point as the at least one neighborhood point.

9. The method of claim 6, wherein after obtaining the at least one neighborhood point nearest to the encoding point within the preset neighborhood range, the method comprises:

obtaining a normal vector of the at least one neighborhood point; and determining the normal vector of the encoding point based on the normal vector of the at least one neighborhood point.

10. The method of claim 1, wherein determining the normal vector of the encoding point in the encoding point cloud comprises:

selecting a feature point from the encoding point cloud;

performing normal vector estimation on the feature point to obtain a normal vector of the feature point;

determining whether the encoding point is continuous with its nearest neighborhood point in a spatial distance;

using a normal vector of the neighborhood point as the normal vector of the encoding point if the encoding point is continuous with its nearest neighborhood point in a spatial distance and the neighborhood point is the feature point;

determining the normal vector of the encoding point based on geometric information of a neighborhood point within a preset neighborhood range of the encoding point if the encoding point is not continuous with its nearest neighborhood point in a spatial distance.

11. The method of claim 10, wherein determining whether the encoding point is continuous with its nearest neighbor point in the spatial distance comprises:

backtracking within a preset neighborhood according to an order of Morton codes, and determining whether the encoding point is continuous with its nearest neighborhood in a spatial distance.

12. The method of claim 1, wherein determining the normal vector of the encoding point in the encoding point cloud comprises:

performing preset block partitioning on the encoding point cloud to obtain n preset blocks;

determining a normal vector of an encoding point in each preset block of the n preset blocks;

accordingly, counting the sum of each coordinate of the normal vector based on the normal vector of the encoding point comprises:

counting a sum of each coordinate of the normal vector in each preset block based on the normal vector of the encoding point.

13. The method of claim 12, wherein determining the transform order based on the sum of each coordinate of the normal vector comprises:

determining a transform order corresponding to the each preset block based on the sum of each coordinate of the normal vector corresponding to the each preset block.

14. The method of claim 1, wherein counting the sum of each coordinate of the normal vector based on the normal vector of the encoding point comprises:

counting a sum of absolute value of each coordinate of the normal vector based on the normal vector of the encoding point.

15. The method of claim 14, wherein determining the transform order based on the sum of each coordinate comprises:
sorting the sum of absolute value in an order from large to small, and determining the transform order.

16. An inverse transform method, applied to decoding, comprising:
parsing a bitstream to obtain a transform order; and
performing inverse Region Adaptive Hierarchical Transform (RAHT) transform based on the transform order during decoding.

17. The method of claim 16, wherein the bitstream comprises attribute information.

18. The method of claim 16, wherein the transform order is an order of coordinate axes.

19. A decoder, comprising: a memory configured to store executable instructions; and
a processor configured to implement following acts when executing the executable instructions stored in the second memory:
parsing a bitstream to obtain a transform order; and
performing inverse Region Adaptive Hierarchical Transform (RAHT) transform based on the transform order during decoding.

20. The decoder of claim 19, wherein the bitstream comprises attribute information, the transform order is an order of coordinate axes.

* * * * *